US010070334B2

(12) United States Patent
Fodor et al.

(10) Patent No.: US 10,070,334 B2
(45) Date of Patent: Sep. 4, 2018

(54) USER EQUIPMENT AND A RADIO NETWORK NODE, AND METHODS THEREIN

(75) Inventors: Gabor Fodor, Hasselby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 14/369,413

(22) PCT Filed: Dec. 29, 2011

(86) PCT No.: PCT/SE2011/051606
§ 371 (c)(1),
(2), (4) Date: Jun. 27, 2014

(87) PCT Pub. No.: WO2013/100831
PCT Pub. Date: Jul. 4, 2013

(65) Prior Publication Data
US 2014/0321314 A1    Oct. 30, 2014

(51) Int. Cl.
*H04L 12/26* (2006.01)
*H04W 24/10* (2009.01)
(Continued)

(52) U.S. Cl.
CPC .......... *H04W 24/10* (2013.01); *H04L 5/0051* (2013.01); *H04W 72/085* (2013.01);
(Continued)

(58) Field of Classification Search
CPC ... H04W 72/04; H04W 72/085; H04W 24/10; H04W 76/023
See application file for complete search history.

(56) References Cited

U.S. PATENT DOCUMENTS 8,554,200 B2 * 10/2013 Ribeiro ............... H04W 72/082
455/422.1
2010/0093364 A1    4/2010 Ribeiro et al.
(Continued)

FOREIGN PATENT DOCUMENTS

JP    2008-532346 A    8/2008
WO    2010/078271 A2    7/2010

OTHER PUBLICATIONS

PCT Written Opinion for Counterpart PCT Application No. PCT/SE2011/051606, (dated Jun. 29, 2014), 11 pages.
(Continued)

*Primary Examiner* — Shukri Abdallah Taha
(74) *Attorney, Agent, or Firm* — Nicholson De Vos Webster & Elliott LLP

(57) ABSTRACT

Embodiments herein relate to a user equipment and a radio network node, as well as to methods therein. The method in the radio network node relates to the control of resource allocation for device-to-device (D2D) communications in a communications network. The network comprises the network node, a first user equipment (UE), and a second UE, wherein at least one of the first and second UEs is a first D2D capable UE. The method comprises configuring the second UE to transmit a reference signal, transmitting configuration information relating to the second UE to the first UE, receiving a measurement result of the measurement performed by the first UE on the transmitted reference signal, and performing one or more radio operation task for a D2D communication between the first D2D capable UE and a second D2D communication capable UE based on the received measurement result.

28 Claims, 10 Drawing Sheets

(51) Int. Cl.
    H04W 72/08    (2009.01)
    H04L 5/00     (2006.01)
    H04W 76/14    (2018.01)
    H04W 72/04    (2009.01)
    H04W 92/18    (2009.01)
(52) U.S. Cl.
    CPC .......... *H04W 76/14* (2018.02); *H04W 72/042* (2013.01); *H04W 92/18* (2013.01)

(56) References Cited

U.S. PATENT DOCUMENTS

| | | | |
|---|---|---|---|
| 2010/0165882 A1 | 7/2010 | Palanki et al. | |
| 2011/0275382 A1* | 11/2011 | Hakola | H04W 24/10 455/452.2 |
| 2012/0263106 A1* | 10/2012 | Lee | H04W 4/005 370/328 |
| 2012/0322457 A1* | 12/2012 | Lee | H04W 4/14 455/452.1 |
| 2013/0136098 A1* | 5/2013 | Li | H04W 72/042 370/330 |
| 2013/0155864 A1* | 6/2013 | Yoshizawa | H04W 4/08 370/235 |
| 2013/0170387 A1* | 7/2013 | Wang | H04W 4/005 370/252 |
| 2014/0286293 A1* | 9/2014 | Jang | H04L 5/0044 370/329 |

OTHER PUBLICATIONS

PCT International Preliminary Report on Patentability for Counterpart PCT Application No. PCT/SE2011/051606, (dated Jul. 1, 2014), 12 pages.

"Notice of Reasons for Ejection," for Counterpart Japanese Application No. 2014-550240, dated Jun. 2, 2015, 2 pages.

PCT International Search Report for Counterpart PCT Application No. PCT/SE2011/051606, (dated Jul. 20, 2012), 3 pages.

Doppler, et al., "Device-to-Device Communication as an Underlay to LTE-Advanced Networks", *Communications Magazine*, IEEE (vol. 47, Issue: 12), (Dec. 2009), pp. 42-29.

Doppler, et al., "Mode Selection for Device-To-Device Communication Underlaying an LTE-Advanced Network", *Wireless Communications and Networking Conference (WCNC)*, 2010 IEEE, (Apr. 18-21, 2010), 6 pages.

Fodor, et al., "Design Aspects of Network Assisted Device-to-Device Communications", *Communications Magazine*, IEEE (vol. 50, Issue: 3), (Mar. 2012), pp. 170-177.

Peng, et al., "Interference avoidance mechanisms in the hybrid cellular and device-to-device systems", *Personal, Indoor and Mobile Radio Communications*, 2009 IEEE 20th International Symposium on, (Sep. 13-16, 2009), 5 pages.

Yu, et al., "Power optimization of device-to-device communication underlaying cellular communication", *Communications*, 2009. ICC '09. IEEE International Conference on, (Jun. 14-18, 2009), 5 pages.

* cited by examiner

USER EQUIPMENT AND A RADIO NETWORK NODE, AND METHODS THEREIN

CROSS-REFERENCE TO RELATED APPLICATIONS

This application is a National stage of International Application No. PCT/SE2011/051606, filed Dec. 29, 2011, which is hereby incorporated by reference.

TECHNICAL FIELD

Embodiments herein relate to a user equipment and a radio network node, as well as to methods therein. In particular, embodiments herein relate to resource allocation for device-to-device (D2D) communication in a communications network.

BACKGROUND

Communication devices such as User Equipments (UE) are enabled to communicate wirelessly in a wireless communications network, sometimes also referred to as a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipments are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

When a user equipment is powered on, it starts an initial cell selection procedure. The purpose of the initial cell selection procedure is to ensure that the user equipment gets into service as fast as possible. The user equipment uses this procedure to scan all Radio Frequency (RF) channels in the E-UTRA bands according to its capabilities to find a suitable cell, where suitable refers to a combination of radio measurements based criteria, e.g. a Reference Signal Received Power (RSRP) and other criteria, e.g. the cell belonging to a Public Land Mobile Network (PLMN) that the user equipment is allowed to camp on.

Once the user equipment camps on a suitable cell, it continues to search for the best cell to camp on. This procedure is called cell reselection. Its purpose is to ensure that the user equipment always camps on the cell that is best in terms of some predetermined set of criteria called the cell ranking criteria. Broadly speaking, cell reselection is the basic idle mode mobility procedure that ensures that the user equipment continuously may receive system broadcast information and continuously may be paged within the coverage area of its PLMN. Cell reselection also ensures that once paged, the user equipment will enter connected mode in a cell that provides good coverage.

Handover refers to the transfer of an ongoing call or data session from one channel connected to a core network to another channel.

Cell change may be used to describe the mobility when the user equipment performs inter-radio access technology (inter-RAT) handovers, e.g. between a GERAN and a WCDMA network. In some networks, such an inter-RAT cell change is supported by sending system information of the new network while still connected to the old network and thereby facilitating the inter-RAT mobility procedure. Cell change may also refer to the collection of idle and connected mode mobility, such as cell (re-)selection and handover procedures, but it may also include the cases of inter-RAT and inter-frequency mobility.

In network assisted Device-to-Device (D2D) communications underlaying a cellular infrastructure, user equipments in the proximity of each other may establish a direct radio link, also referred to as a device-to-device link or bearer. In this description, the expression device-to-device will be referred to as D2D. Network assisted D2D communications is sometimes also referred to as network D2D communications underlaying a cellular radio access network, or for short D2D as a RAN underlay.

While the user equipments communicate over the D2D link, they also maintain a cellular connection with their respective serving network node, i.e. serving base station. That way the cellular RAN may assist and supervise the user equipments in allocating cellular resources for the D2D link, comprising e.g. mode selection, indicating a maximum power level to the transmitting user equipment and, in general protecting the D2D link from interference from cellular user equipments or base stations. Likewise, the cellular RAN has means to protect the cellular communications links, herein also sometimes referred to as cellular bearers, from harmful interference caused by transmitting D2D user equipments.

FIG. 1 schematically illustrates a network assisted D2D communications scenario in a RAN according to prior art. A user equipment A, UE-A, capable of D2D communication is connected to a first network node, e.g. a serving base station eNB-A, and a user equipment B, UE-B, capable of D2D communication is connected to a second network node, e.g. a serving base station eNB-B. The RAN comprises in this example the user equipments UE-A, UE-B; the first and second network nodes, eNB-A, eNB-B, and cellular user equipments UE-1 and UE-2 having a cellular connection, e.g. a cellular link, with their respective serving network node, eNB-A and eNB-B. Further, the user equipment A and the user equipment B are in the proximity of each other. In such a case, the RAN may assist the user equipments A, and B to establish a D2D link over which the user equipments A, and B communicate.

When used in this description, by user equipments in the proximity of each other is meant user equipments that are positioning within a distance of 100-150 m from each other. However, devices communicating in licensed spectrum bands, and consequently allowed to transmit with higher power levels, such as 24 dBm, may, under certain propagation conditions, be able to discover and transfer data to each other over larger distances, e.g. over distances up to 1000 m.

While the user equipments A, and B communicate over the D2D link, they also maintain a cellular connection with their respective serving base station eNB-A, eNB-B, cf. FIG. 1. In this way the cellular RAN assists the user equipments A, and B in allocating cellular resources for the D2D link, indicating a maximum power level to the transmitting user equipment and, in general protecting the D2D link from interference from cellular user equipments or base stations. The basic rationale for network assisted D2D communications is to allow short range direct communication between user equipments utilizing cellular spectrum.

FIG. 2 schematically illustrates a part of a communications network comprising user equipments 202 with D2D communication functionality, user equipments 204 without D2D communication functionality, and a radio network node 206. The radio network node 206 provides radio coverage over at least one geographic area forming a cell 208.

The user equipments 202 with D2D communication capability is herein sometimes referred to as a D2D capable user equipments 202, and the user equipments 204 without D2D communication functionality is herein sometimes referred to as a cellular user equipments 204 and/or a legacy user equipments 204.

Further, FIG. 2 schematically illustrates a typical coexistence scenario between cellular user equipments 204 and user equipments 202 having D2D functionality. As schematically illustrated, the user equipments 202-1 constitute a first D2D pair; D2D pair 1, the user equipments 202-2 constitute a second D2D pair; D2D pair 2, and the user equipments 202-3 constitute a third D2D pair; D2D pair 3.

In this scenario it is assumed that the D2D link between the user equipments 202 of a D2D pair uses uplink spectrum resources. In such case the receiver (not shown) of one of the user equipments 202 in a D2D pair may suffer from interference from transmission from the cellular user equipments 204, while the network node 206 may suffer from interference from transmission from a transmitter (not shown) of one of the user equipments 202 in a D2D pair.

D2D communication capable user equipments are expected to be introduced gradually into existing and evolving cellular networks, such as the 3GPP LTE and LTE-Advanced networks.

The resources used for the D2D communication link between user equipments 202 of a D2D pair may partly overlap with the resources used by the cellular, legacy, user equipments 204 for communication with their respective serving network node 206.

As schematically illustrated in FIG. 2, when the D2D links of the D2D pairs are allocated uplink resources, three types of interference situations may arise.

Type-1 interference is caused by transmitting cellular user equipments 204 transmitting in UL resources causing interference to receiving user equipment 202 capable of D2D communication.

Type-2 interference is caused by user equipments 202 capable of D2D communication and transmitting in UL resources causing interference to the receiving D2D capable user equipments 202 of other D2D pairs.

Type-3 interference is caused by user equipments 202 capable of D2D communication and transmitting in UL resources causing interference to the radio network node 206.

In existing cellular systems, the cellular user equipments are required to make physical layer measurements of the downlink radio characteristics. Such measurements are typically reported to the higher layers and are used for a variety of purposes, notably for various types of handover decisions made in the RAN. They are also used for other mobility functions such as change of Primary Cell (PCell) or Primary Component Carrier (PCC) in multi-carrier systems, also known as a carrier aggregation. The measurements are also used autonomously by the cellular user equipment for performing cell selection, i.e. initial cell selection, cell reselection, in idle or low activity states.

The physical layer measurements performed by the cellular user equipments are typically of type: signal strength measurements, e.g. measurements of Reference Signal Receive Power (RSRP) in LTE, or signal quality measurements e.g. measurements of Reference Signal Received Quality (RSRQ) in LTE. The measurements of RSRP and RSRQ may be absolute as well as relative measurement quantities.

For the absolute measurement, the RSRP and RSRQ are measured from one cell, e.g. from a serving cell or a neighbour cell. The user equipment may report the absolute measurement results periodically. However, the absolute measurement from the serving cell or the neighbour cell may also be compared with a threshold value by the user equipment. The threshold value may be configured by the network but it may also be pre-defined. The results of the comparison may be reported by the user equipment in terms of an event, e.g. the user equipment may report an event if neighbour cell RSRQ is above a threshold value of X dB, wherein X may be a value between 2 and 6 dB.

The event may be a form of a measurement report which is sent by the user equipment to the network when certain conditions are met. For example, as previously described the user equipment reports an event if a neighbour cell RSRQ is above a threshold value of X dB, e.g. 2 dB.

The relative measurement may be obtained by comparing the measurements done on the serving cell and neighbour cells with each other. The results of the comparison of the serving cell and the neighbour cell measurement results may also be reported by the user equipment in terms of an event, e.g. the user equipment may report an event if neighbour cell RSRQ compared to serving cell RSRQ is above a threshold value of Y dB, wherein Y may be a value between 2 and 4 dB.

As illustrated in FIG. 2, in order for the radio network node 206 to be able to schedule resources, e.g. Physical Resource Blocks (FRB), for D2D communication and to set the maximum transmission power of the transmitting user equipment 202 capable of D2D communication, the radio network node 206 requires to have knowledge or at least an estimation about the Interference caused by cellular user equipments 204 at the receiving user equipment 202 capable of D2D communication and to have knowledge or at least an estimation about path loss between the cellular user equipment 204 and the receiving user equipments 202 capable of D2D communication.

A drawback with the prior art system is the lack of information about either the interference caused at the receiving user equipment 202 capable of D2D communication or the path loss between cellular user equipments 204 and receiving user equipment 202 capable of D2D communication.

SUMMARY

An object of embodiments herein is to provide a way of improving the performance in a communications network.

According to a first aspect of embodiments herein, the object is achieved by a method in a first user equipment for performing a measurement on a reference signal transmitted by a second user equipment in order to assist in resource allocation for device-to-device, D2D, communication in a communications network. At least one of the first and second user equipments is a first D2D capable user equipment. The first user equipment, the second user equipment and a radio network node are comprised in the communications network.

The first user equipment receives configuration information from the radio network node, which configuration information relates to the reference signal transmitted by the second user equipment. Further, the first user equipment performs a measurement on the reference signal transmitted by the second user equipment, which measurement is based on the received configuration information. Then the first user equipment reports a result of the performed measurement to the radio network node.

According to a second aspect of embodiments herein, the object is achieved by a first user equipment for performing a measurement on a reference signal transmitted by a second user equipment in order to assist in resource allocation for D2D communication in a communications network. At least one of the first and second user equipments is a first D2D capable user equipment. Further, the first user equipment, the second user equipment and a radio network node are comprised in the communications system.

The first user equipment comprises a receiving circuit configured to receive configuration information from the radio network node, which configuration information relates to the reference signal transmitted by the second user equipment. Further, the first user equipment comprises a performing circuit configured to perform a measurement on the reference signal transmitted by the second user equipment, the measurement being based on the received configuration information. The first user equipment comprises further a reporting circuit configured to report a result of the performed measurement to the radio network node.

According to a third aspect of embodiments herein, the object is achieved by a method in a radio network node for controlling resource allocation for D2D communication in a communications network. The communications network comprises the radio network node, a first user equipment and a second user equipment, wherein at least one of the first and second user equipments is a first D2D capable user equipment.

The radio network node configures the second user equipment to transmit a reference signal and transmits configuration information relating to the second user equipment to the first user equipment. Further, the radio network node receives a result of a measurement on the reference signal transmitted by the second user equipment, which measurement being performed by the first user equipment on the transmitted reference signal. Then, the radio network node performs one or more radio operation task for a D2D communication between the first D2D capable user equipment and a second D2D capable user equipment based on the result of the measurement.

According to a fourth aspect of embodiments herein, the object is achieved by a radio network node for controlling resource allocation for D2D communication in a communications network. The communications network comprises the radio network node, a first user equipment and a second user equipment, wherein at least one of the first and second user equipments is a first D2D capable user equipment.

The radio network node comprises a configuring circuit configured to configure the second user equipment to transmit a reference signal, and a transmitting circuit configured to transmit configuration information relating to the second user equipment to the first user equipment. Further, the radio network node comprises a receiving circuit configured to receive a result of a measurement on the reference signal transmitted by the second user equipment, which measurement is performed by the first user equipment on the transmitted reference signal. The radio network node comprises further a performing circuit configured perform one or more radio operation task for a D2D communication between the first D2D capable user equipment and a second D2D capable user equipment based on the result of the measurement.

Since the first user equipment is configured to perform a measurement on a reference signal transmitted by the second user equipment, wherein at least one of the first and second user equipments is a first D2D capable user equipment, since the first user equipment is configured to report the measurement result to the radio network node, and since the radio network node is configured to perform one or more radio operation task for a D2D communication between the first D2D capable user equipment and a second D2D capable user equipment based on the measurement result, the radio network node is able to control resource allocation for D2D communication in the communications network. This results in an improved performance in the communications network by allowing the coexistence of legacy, cellular, user equipments and of user equipments capable of D2D communication.

An advantage of embodiments herein is that the radio network node is able to perform radio network operation tasks, and in particular to schedule and allocate resources for both the legacy, cellular, user equipments and the user equipments capable of D2D communication in such a way that harmful interference levels between the cellular layer and the D2D layer are avoided.

A further advantage of embodiments herein is that the radio network node may determine which D2D pairs and cellular user equipments that may use the same radio resources. This means that the radio network node may execute a so called pairing of D2D pairs with cellular user equipments. Therefore the radio resource utilization efficiency is improved without causing harmful interference to cellular operation and D2D operation.

A further advantage of embodiments herein is that the radio network node may determine the appropriate transmit power of the D2D pair such that the D2D transmit power is appropriate both for the D2D communication and for the cellular communication link. This in turn saves battery life of the D2D pair since transmit power is adequately managed.

BRIEF DESCRIPTION OF THE DRAWINGS

Embodiments will be described in more detail with reference to the following drawings, in which.

DETAILED DESCRIPTION

Embodiments herein will be exemplified in the following non-limiting description.

Figure 1:
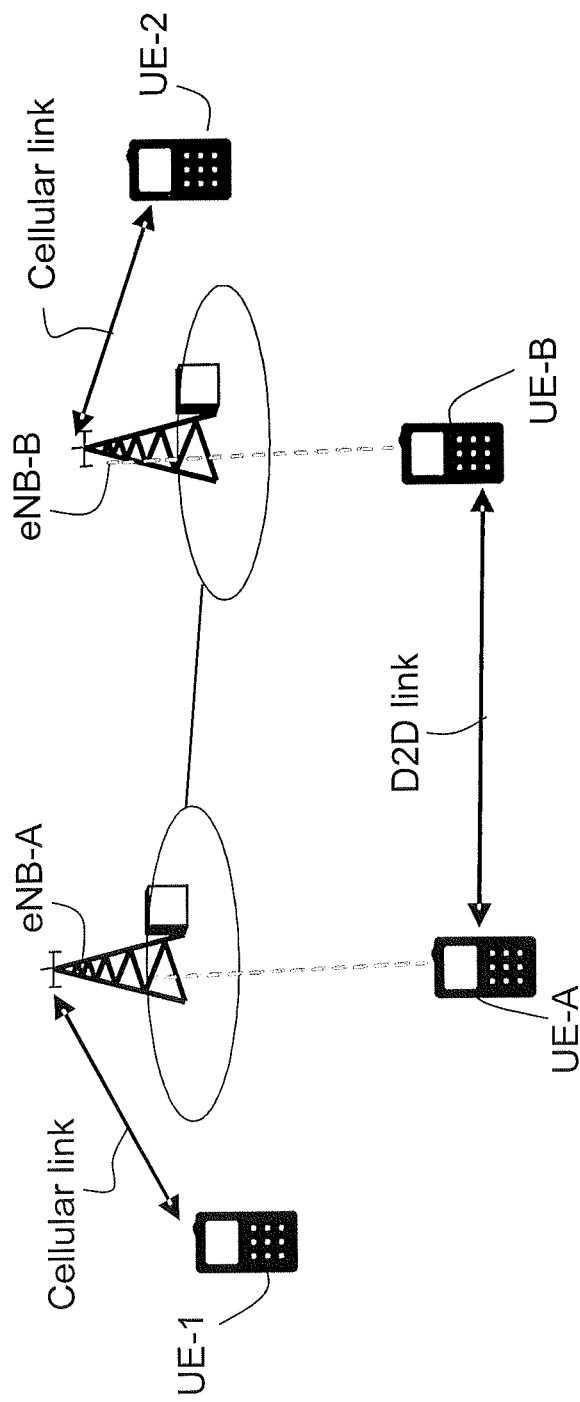
FIG. 1 is a schematic block diagram illustrating a prior art communications network.
Figure 2:
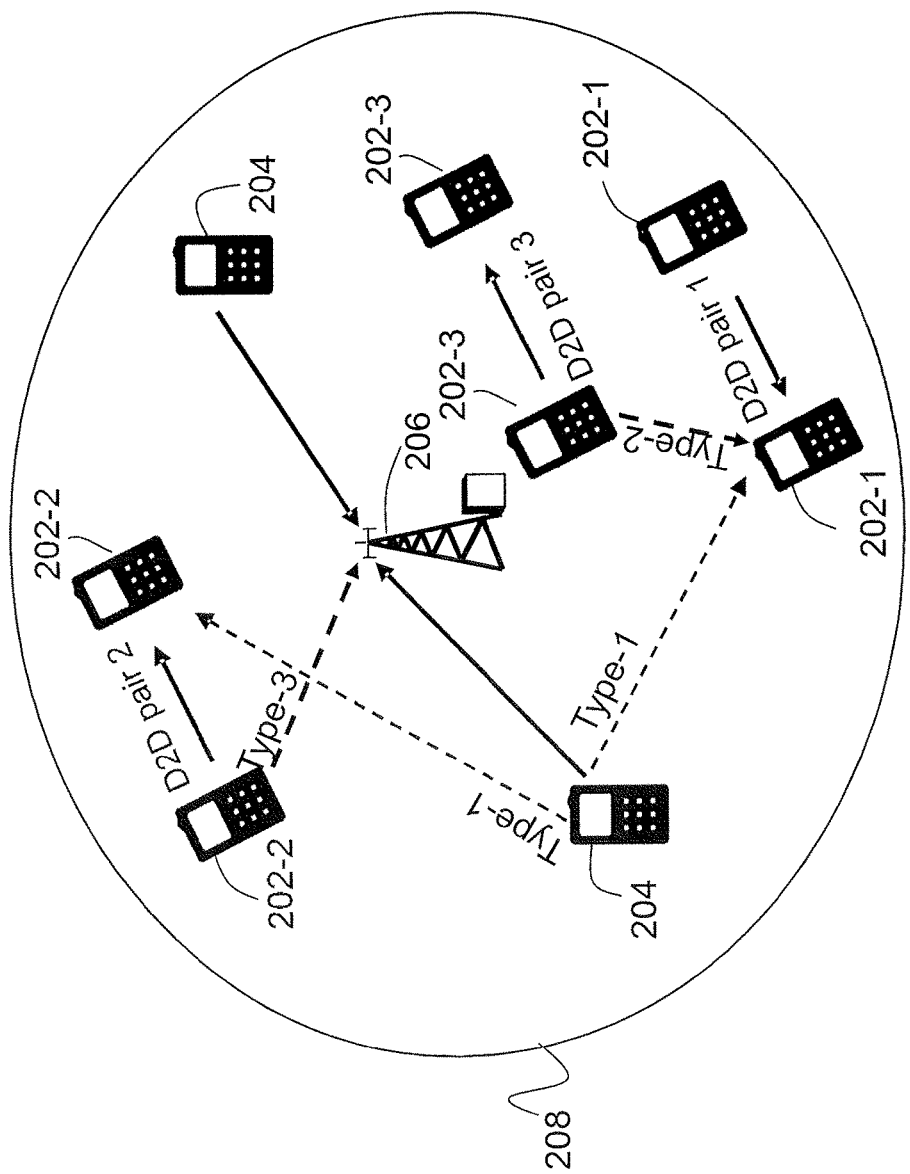
FIG. 2 is a schematic block diagram illustrating a prior art communications network.
Figure 3A:
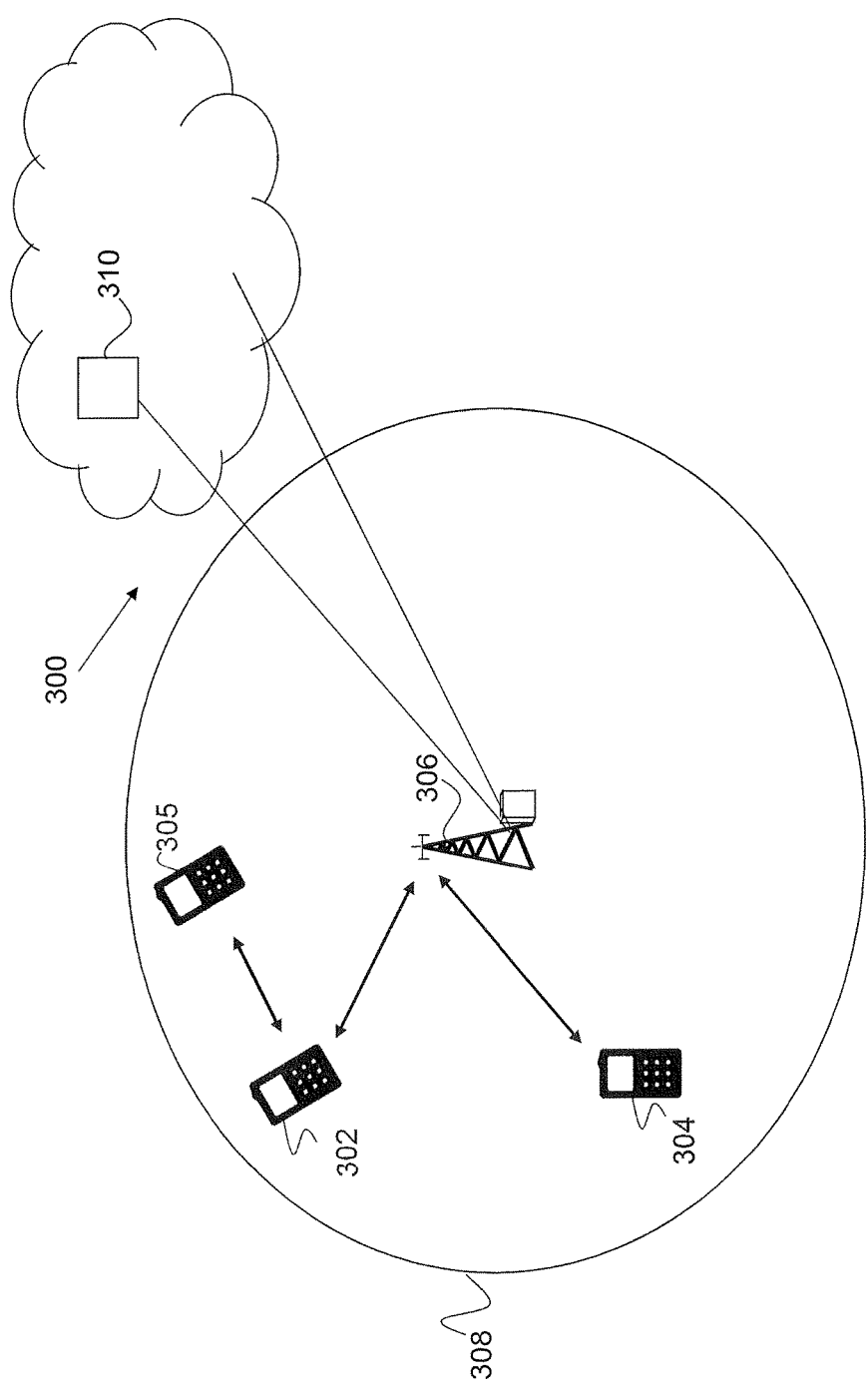
FIGS. 3a-c are schematic block diagrams illustrating embodiments of a communications network.
Figure 3B:
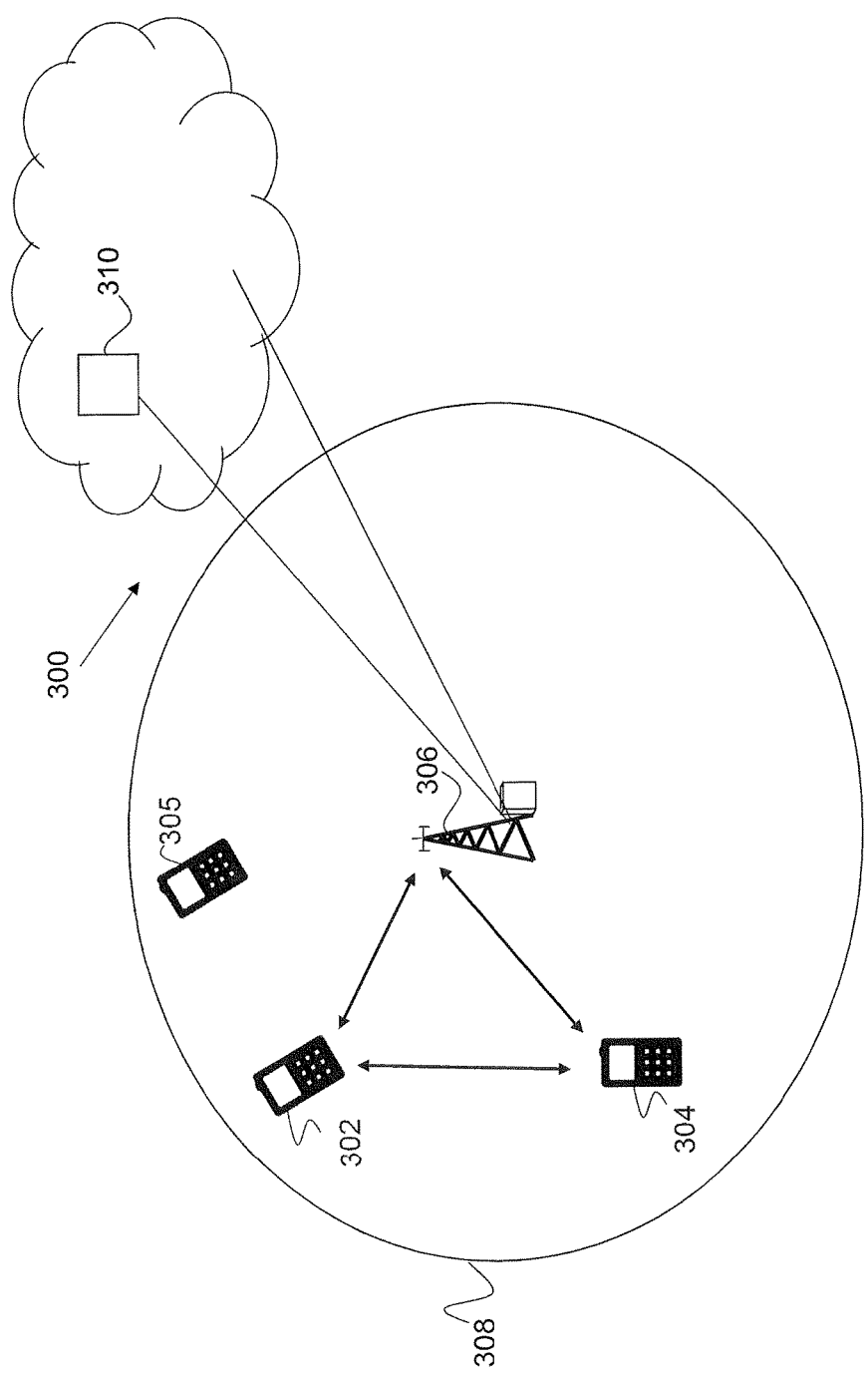
Figure 3C:
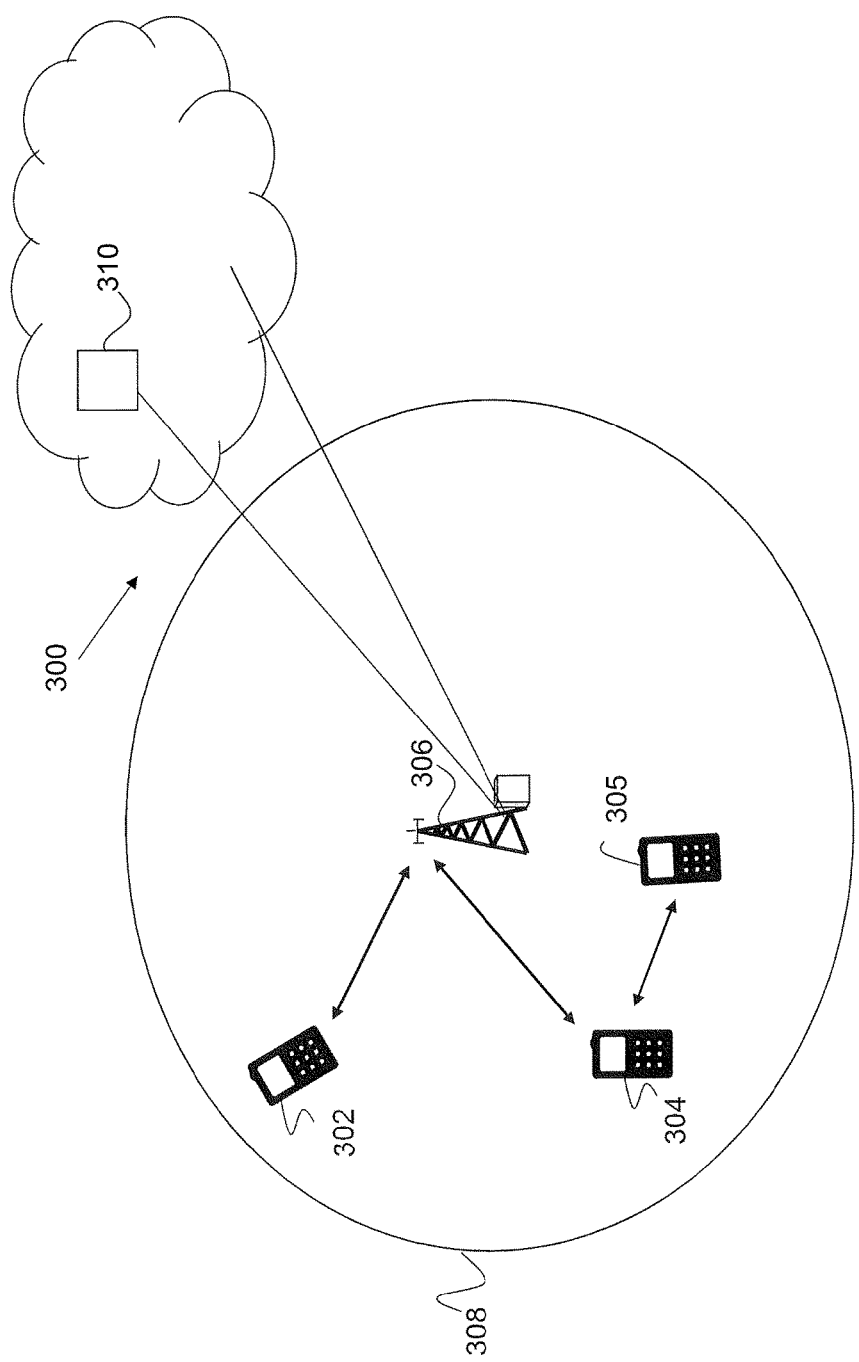

FIGS. 3a-c schematically illustrate embodiments of a communications network 300. The communications network 300 comprises a first user equipment 302, and a second user equipment 304, wherein one of the first user equipment 302 and the second user equipment 304 is a first user equipment capable of D2D communication, which is also herein sometimes referred to as a first D2D capable user equipment. The communications network 300 may further comprise a third user equipment 305, which third user equipment 305 is capable of D2D communication.

In FIG. 3a, the first user equipment 302 is the first D2D capable user equipment, the second user equipment 304 is a cellular user equipment, and the third user equipment 305 is a second D2D capable user equipment. The arrow between the first user equipment 302 and the third user equipment 305 schematically indicate that a D2D communication link may exist between them.

In FIG. 3b, the first user equipment 302 is the first D2D capable user equipment, the second user equipment 304 is the second D2D capable user equipment, and the third user equipment 305 is a third D2D capable user equipment. In this example, a D2D communication link may exist between the first and second user equipments 302,304.

In FIG. 3c, the first user equipment 302 is a cellular user equipment, the second user equipment 304 is the first D2D capable user equipment, and the third user equipment 304 is the second D2D capable user equipment. The arrow between the second user equipment 304 and the third user equipment 305 schematically indicate that a D2D communication link may exist between them.

The user equipments 302,304,305 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The user equipments 302, 304,305 may further be configured for use in both a 3GPP network and in a non-3GPP network.

The communications network 300 comprises further a radio network node 306 serving one or more of the first and second user equipments 302,304. The radio network node 306 provides radio coverage over at least one geographic area forming a cell 308. The first and second user equipments 302,304 transmit data over a radio interface to the radio network node 306 in an uplink (UL) transmission and the radio network node 306 transmits data to the user equipments 302,304 in a downlink (DL) transmission. A number of other user equipments, not shown, may also be located within the respective cells 308

The radio network node 306 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve the first and second user equipments 302,304 in the cellular communications system.

In some embodiments herein, the radio network node 306 is configured to acquire information about interference caused at a receiving user equipment capable of D2D communication or information about path loss between a cellular user equipment and the receiving user equipment capable of D2D communication, despite the limitation of the legacy cellular user equipments as described above. Based on the information about interference and/or the information about path loss, the radio network node 306 is able to allocate resources for D2D communication in the communications network 300, as will be described below.

In some embodiments, the communications network 300 further comprises a network node 310, such as an Operations Support System (OSS) node, an Operation and Maintenance (O&M) node, a Self Organizing Network (SON) node, a Minimization of Drive Test (MDT) node, a networking monitoring node, network management node, a network planning node, a core network node, a positioning node etc.

The network node 310 may be configured to perform one or more network operation task such as network planning, network monitoring, network management or tuning of network operational parameters.

Embodiments herein relate to resource allocation for D2D communication in the communications network 300. In particular, embodiments herein relate to the first user equipment 302 configured to perform a measurement on a reference signal sent in uplink by the second user equipment 304 and to send a result of the measurement to the radio network node 306. At least one of the first and second user equipments 302,304 is a first user equipment capable of D2D communication. Embodiments herein also relate to the radio network node 306 configured to allocate resources for D2D communication based on the received measurement result.

In this description it will be assumed that the D2D pairs use UL cell resources, i.e. UL spectrum in Frequency-Division Duplexing (FDD) or Half Duplex (HD)-FDD, UL subframes in Time-Division Duplexing (TDD) etc. for communication. However, it should be understood that the present description is not limited to case when UL resources are used for D2D communication but it is also valid for the case when DL resources are used for D2D communication.

By configuring user equipments capable of D2D communication to perform measurements on UL signals transmitted from legacy cellular user equipments and on PRBs used by legacy cellular user equipments, and by configuring the user equipments capable of D2D communication to provide measurement results to the radio network node, the radio network node is configured to acquire the information about interference and/or the information about path loss needed for resource allocation for D2D communication.

It should be understood that the user equipments capable of D2D communication also may be configured to perform measurements on DL signals from legacy cellular user equipments and configured to provide measurements results to the radio network node. Therefore, the radio network node needs to properly handle the DL and UL measurement results such that the measurement results are effectively used for managing the D2D links and the coexistence of the D2D communication layer and the cellular communication layer.

Figure 4:
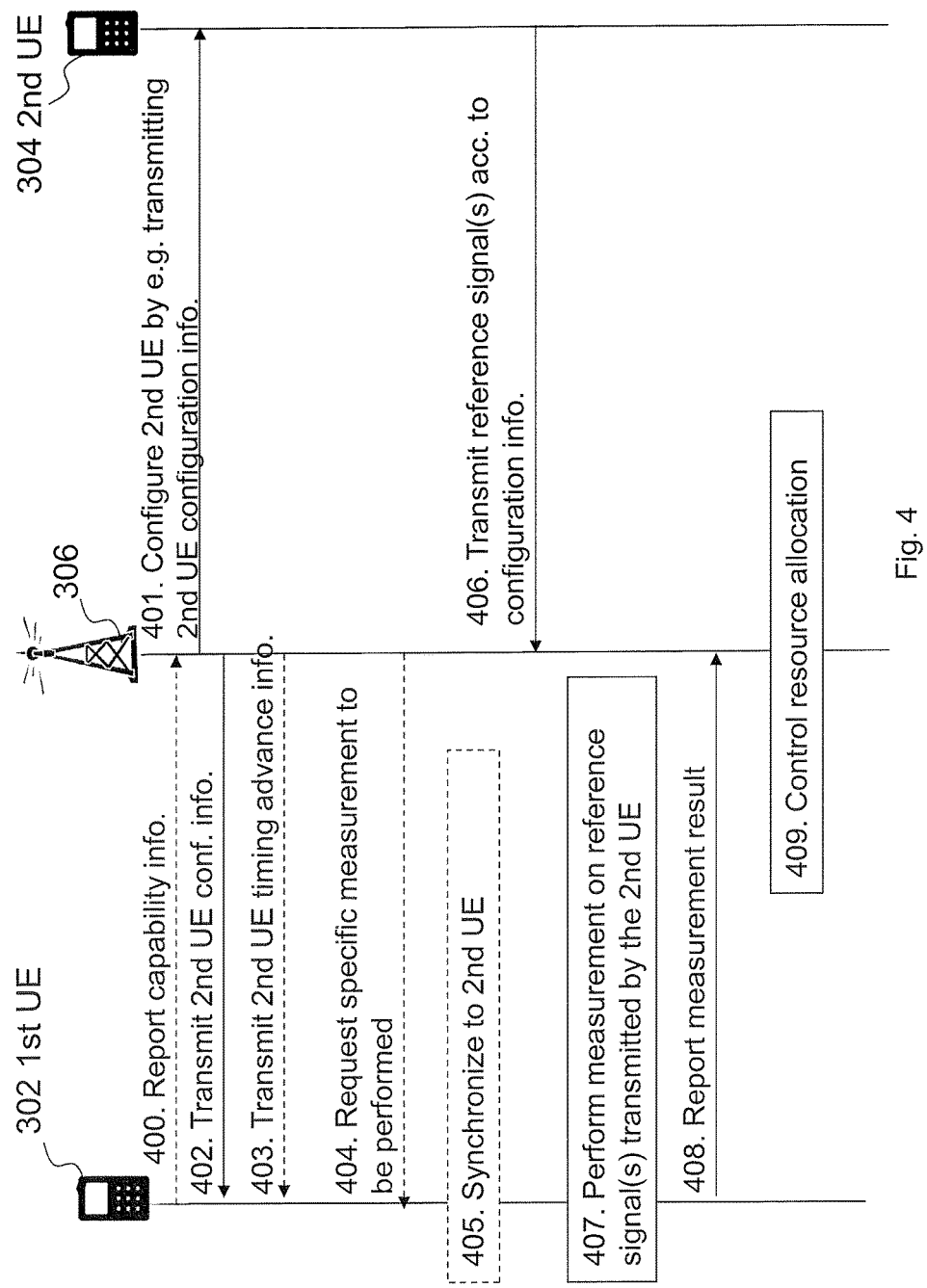
FIG. 4 is a schematic combined flowchart and signalling scheme of embodiments of a communications network.

FIG. 4 is a schematic combined flowchart and signalling scheme for allocating resources for D2D communications in the communications network 300.

The communications network 300 comprises the first user equipment 302 configured to perform a measurement on a reference signal transmitted by the second user equipment 304 comprised in the communications network 300. One of the first and second user equipments 302,304 is a first user equipment capable of D2D communication. Further, the communications network 300 comprises a radio network node 306 configured to serve the first and second user equipments 302,304.

Actions for allocating resources for D2D communications in a communications network 300 will now be described with reference to FIG. 4. The actions do not have to be performed in the order stated below, but may be taken in any suitable order. Further, actions may be combined.

Action 400

The first user equipment 302 may report that it is capable of performing a measurement on a reference signal transmitted by the second user equipment 304 in order to assist in resource allocation for D2D communication in the communications network 300. This may be performed since not all first user equipments 302 may be capable of performing such a measurement when D2D communication is used in the communications network 300. This will be described in more detail in relation to action 500 below.

Action 401

In order to configure the second user equipment 304, the radio network node 306 transmits configuration information to the second user equipment 304.

The configuration information may comprise information necessary for the second user equipment 304 to generate and transmit a reference signal to the radio network node 306. Thus, the configuration information may comprise timing information, subcarrier information, information about modulation symbols to be used, e.g. the Zadoff-Chu sequence, and/or the information about the transmit power to use, etc. . . . . .

The configuration information may for example configure the second user equipment 304, to transmit a reference signal over a certain time period, e.g. a reference signal over part of or over the entire bandwidth of the spectrum, i.e. over a single or multiple PRBs.

By the term "Reference Signal (RS)", when used herein is meant a Primary Synchronization Signal (PSS), a Secondary Synchronization Signal (SSS), a Sounding Reference Signal (SRS), a DeModulation Reference Signal (DMRS) an arbitrary pilot signal, or a pre-defined signal.

The radio network node 306 may use a broadcast parameter or user equipment specific signaling, e.g. higher layer signaling such as Radio Resource Control (RRC) signaling, to transmit the configuration information to the second user equipment 304. Thereby, the radio network node 306 may e.g. configure the parameters of the UL channel sounding by means of the RS. The RS parameters may comprise, but it's not limited: RS bandwidth, RS duration and periodicity, RS location within the subframe, cyclic shift, e.g. root parameters, for the Zadoff-Chu sequence, and/or hopping sequence information for the RS.

Further, the radio network node 306 may indicate a time period over which the second user equipment 304 should transmit one or more reference signal using the UL configuration information. The time period may be expressed as a starting time point and a terminating time point or as a combination of a starting time point and a duration of the transmission. The second user equipment 304 may derive the UL transmit time period based on a pre-defined rule. For example, the time point to start the UL transmission may be a function of the DL frame timing, e.g. System Frame Number, and an offset.

In some embodiments, when the second user equipment 304 is scheduled, the radio network node 306 configures one or more parameter of the DMRS. For example, the DMRS sequence length may depend on the number of subcarriers allocated to the second user equipment 304 for the Physical Uplink Shared CHannel (PUSCH) transmission.

Further, one or more of the transmit configurations of the second user equipment 304 may be a pre-defined configuration or may be a default configuration. In such cases, the configuration of the second user equipment 304 performed by radio network node 306 may be a request from the radio network node 306 to the second user equipment 304 to start one of the pre-defined configurations or a default configuration at a certain point of time. The starting time point for transmission may be a predefined starting time point or it may be a starting time point configurable by the radio network node 306.

Action 402

In order for the first user equipment 302 to have knowledge about the reference signal the second user equipment 304 is to generate, the radio network node 306 transmits the configuration information for the second user equipment 304 to the first user equipment 302.

If the number of first and second user equipments 302,304 in the cell 308 is low, e.g. less than ten user equipments, then the radio network node 306 may transmit the configuration information for the second user equipment 304 to the first user equipment 302 by dedicated signaling. For example, the configuration information may be sent as part of the "mode selection" signaling, which is well known and will not be described in more detail here.

If the number of first and second user equipments 302,304 in the cell 308 is high, e.g. higher than ten user equipments, then the radio network node 306 may use broadcast signaling or multicast signaling to let the first user equipment 302 know of the configuration information for the second user equipment 304. Since the D2D mode selection is on the time scale of hundreds of ms, the broadcasting of the configuration parameters may also be on that time scale, e.g. 100 ms.

The transmit Power Density (PD) of the reference signal is the same as the PD allocated for the PUSCH. Therefore, for the purpose of path loss estimation or path gain estimation, the transmit power is made known to the first user equipment 302 by the radio network node 306 as part of the configuration information.

Action 403

The radio network node 306 may further transmit timing advance information for the second user equipment 304 to the first user equipment 302. By receiving the timing advance information for the second user equipment 304, the first user equipment 302 may acquire and/or lock on to the one or more reference signal transmitted by the second user equipment 304. The transmit timing advance information may comprise the Timing Advance (TA) of the second user equipment 304. For example, by knowing the UL frame timing of the second user equipment 304, the first user equipment 302 may immediately start correlating over the reference signal in order to perform a measurement on the reference signal.

Further, the applied timing advance at the second user equipment 304 helps to counteract the propagation delay differences between different user equipments. Further, the applied timing advance at the second user equipment 304 may be used to determine timing alignment, which timing alignment is necessary in order to maintain UL orthogonality between the different user equipments 302,304.

Alternatively, if such timing advance information is not provided to the first user equipment 302, the first user equipment 302 may have two options. An option may be to assume that the transmit timing of the first and second user equipments 302,304 is the same. This may be according to a pre-defined rule or explicitly indicated by the radio network node 306. Another option may be that the first user equipment 302 synchronizes to the second user equipment 304 by correlating over a known signal, e.g. a reference signal, as will be described in action 405.

Action 404

The radio network node 306 may request the first user equipment 302 to perform a specific measurement.

In some embodiments, the radio network node 306 explicitly indicates to the first user equipment 302, e.g. the first D2D capable user equipment in a D2D pair, the type of measurement to be performed on UL reference signals transmitted by the second user equipment 304, e.g. a cellular user equipment. For example, the requested measurement may be a measurement of reference signal strength, e.g. analogous to the RSRP; the reference signal quality, e.g. analogous to the RSRQ; the path loss; and/or the UL channel state information, e.g. analogous to Channel State Information (CSI), etc. The radio network node 306 may also provide additional measurement configuration parameters to be used by the first D2D capable user equipment 302. Such configuration parameters may include the reporting mechanism, e.g. periodic, event triggered, event triggered periodic, measurement period, higher layer filtering parameter and/or higher layer filtering co-efficient etc, which will be described in more detail under action 408 below. It should be understood that the measurement configuration parameters may be pre-defined.

Action 405

The first user equipment 302 may synchronize to the second user equipment 304.

As previous mentioned, if the timing advance information is not provided, the first user equipment 302, e.g. the receiving user equipment 302 capable of D2D communication, may synchronize to the second user equipment 304, e.g. to a cellular user equipment, by correlating over a known signal, e.g. a reference signal, a pilot signal, a sounding reference signal etc. The known signals to assist the first user equipment 302, e.g. the first D2D capable user equipment, in attaining the synchronization of the second user equipment 304, e.g. the cellular user equipment, may be sent at regular interval by the second user equipment 304.

By a user equipment-to-user equipment synchronization, e.g. a first user equipment 302 to a second user equipment 304 synchronization, is meant both a time, e.g. a symbol, synchronization and a frequency synchronization. Time synchronization means that the two user equipments are able to determine the exact time instant at which a transmitted symbol, e.g. an OFDM symbol, starts. In other words, the two user equipments may rely on the notion of a common clock and 0 point in time. Frequency synchronization means that the two user equipments use the same carrier frequency and subcarrier frequencies. That is any carrier frequency offset between the two UEs is eliminated. The combined time and frequency synchronization means that the two user equipments use the same time-frequency notion, and thereby, that the two user equipments use the same notion of PRBs.

In, for example, the 3GPP LTE system, DL synchronization between an eNB and a user equipment is obtained by using predefined (primary and secondary) synchronization channels (P-SCH and S-SCH) that use one or more predefined complex sequences, e.g. a Zadoff-Chu sequence, which one or more predefined complex sequences the user equipment may capture and synchronize to in order to synchronize its clock and eliminate its frequency offset.

Action 406

The second user equipment 304 transmits one or more reference signal in accordance with the configuration information received. The one or more reference signal may be transmitted in UL to the radio network node 306.

Action 407

The first user equipment 302 performs a measurement on the one or more reference signal transmitted by the second user equipment 304 to the radio network node 306.

With the received configuration information and possible timing advance information, cf. actions 402 and 403, the first user equipment 302 may perform measurements on the reference signal transmitted by the second user equipment 304. The measurements performed by the first user equipment 302 may correspond to the measurements performed by the radio network node 306 to implement frequency selective scheduling.

In LTE, corresponding to the measurements performed by the radio network node 306 are measurements on the reference signal transmitted with preconfigured and known parameters in order to enable channel quality estimation on the UL, including PRBs that are not used to transmit data. A purpose for the measurements may be to support UL frequency scheduling. The radio network node 306 may also use the acquired channel quality estimation for other purposes, such as enhancing UL power control or initial Modulation and Coding Scheme (MCS) selection for a user equipment recently not scheduled, or initial power control for data transmission, etc.

Action 408

The first user equipment 302 reports the measurement result to the radio network node 306. This may be performed by conventional UL signaling. For example, the first user equipment 302 may report the results to the radio network node 306 using a signaling protocol such as RRC or in a Medium Access Control (MAC) Protocol Data Unit (PDU). Further, the first user equipment 302 may report the results using existing mechanisms such as periodic, event triggered or event-triggered periodic. The radio network node 306 may have configured the first user equipment 302 to report the results using a specific mechanism. The radio network node 306 may also have configured the first user equipment 302 to report the results by using configurable parameters, e.g. higher layer filtering parameters, reporting thresholds, measurement bandwidth over which the measurement is to be performed etc.

To support D2D communications, the first user equipment 302 may act similarly to the radio network node 306, but it needs to report only on the second, cellular, user equipments 304 that are strong interferers. Based on the received reference signals from the second user equipment 304, the first user equipment 302 may select the strongest n second user equipments 304 to be reported to the radio network node 306. Where n is an integer, for example n=3.

The measurement and the measurement result reporting may be based on a pre-defined rule or on a configuration done by the radio network node 306.

The first user equipment 302 may provide the measurement results to the radio network node 306 by providing a table comprising the measurements results from the second user equipments 304 being the n strongest interferer.

In some embodiments, the first user equipment 302 may provide the measurement results to the radio network node 306 by providing a list of only the identity the n strongest interfering second user equipments 304 to the radio network node 306, without any details about the measurement results, whereby the signalling overhead may be reduced.

Further, the first user equipment 302 may provide a list of the K second user equipments 304 for which second user equipments 304 the received signal level, e.g. reference signal strength, reference signal quality, or path, etc, is above a threshold level. The threshold level may be configurable by the radio network node 306 or it may be a pre-defined threshold level. The threshold level may be stored in a memory comprised in or connected to the radio network node 306.

The result reporting from first user equipment 302 to the radio network node 306 may be event triggered, periodic or event-triggered periodic. For example, the first user equipment 302 may be triggered to perform result reporting by completion of the measurement on the reference signal. Further, the first user equipment 302 may report the result periodically, e.g. at predetermined points in time. Furthermore, the first user equipment 302 may be event-triggered to report, e.g. to report when the result of the measurement exceeds a preconfigured threshold.

Further, the result reporting may be performed for the entire UL bandwidth or separately for each group of Resource Blocks (RBs), e.g. 1 or more RB per group, as requested by the radio network node 306.

Action 409

The radio network node 306 controls the resource allocation for D2D communication based on the measurement result received.

For the radio network node 306, the measurement result from the first user equipment 302 may be of importance for mode selection and for scheduling and resource allocation.

In the case of mode selection of a user equipment 302,304 that is a candidate for D2D communication, the radio network node 306 may decide not to select the D2D mode for a user equipment 302,304 that is a candidate for D2D communication if the interference caused by the cellular layer is too high, e.g. too heavy "near-far effect".

In the case of scheduling and resource allocation, the radio network node 306 may, based on the received measurement results, reschedule either the cellular user equipments or D2D capable user equipments in a D2D pair for which the measurement result indicates a too high interference level.

Thus, the radio network node 306 may use the received measurement results for multiple purposes in order to control D2D communication and the coexistence of D2D and cellular layers. By receiving the measurement results, the radio network node 306 will have information of which D2D Rx nodes suffer high interference from which cellular user equipments on which PRBs. Thereby, the radio network node 306 may perform various D2D management tasks.

Some examples of D2D management task will be given below.

The radio network node 306 may perform frequency and time domain scheduling of D2D traffic and cellular traffic.

The radio network node 306 may perform antenna mode selection for uplink transmission e.g. beamforming for cellular communication to avoid interference towards a specific D2D pair.

Further the radio network node 306 may perform adaptation of transport format. For example, in case there is strong interference from a cellular user equipment towards a D2D pair, the radio network node 306 may select a more robust transport format, e.g. a lower order modulation and/or low code rate, for the cellular user equipment. Thereby, the transmit power of the cellular user equipment is reduced, which causes less interference to the receiving user equipment of a D2D pair.

In some embodiments, the radio network node 306 may perform power control of UL cellular transmissions and D2D transmissions. For example, the radio network node 306 may perform may adjust one or more parameters associated with the user equipment transmit power offset in case there is strong interference from a cellular user equipment towards a D2D pair.

The radio network node 306 may further perform cell change for interference avoidance. For example, the radio network node 306 may change the serving carrier of the cellular user equipment, e.g. by inter-frequency handover or inter-RAT handover depending upon the capability of the cellular user equipment, to lower interference towards D2D pairs e.g. if the cellular user equipment is close to a plurality of D2D pairs.

Further, the radio network node 306 may perform network planning and management tasks. For example, the radio network node 306 may use the measurement results obtained from D2D user equipments for long term interference management in the cell. In another example, the radio network node 306 may signal the measurement results obtained from D2D user equipments to another radio network node 306 or to other network nodes 310. As previous described, the other network node 310 may be an OSS node, a SON node, a MDT, an O&M node, a networking monitoring node, network management node, a network planning node, a core network node, a positioning node, a centralized node, a network controlling node, etc. The network node 310 may use the measurement results for network planning and management. For example, the other network nodes 310 may determine the number of cellular user equipments and D2D pair that may co-exist given the cell resources. Further, the network node 310 may tune or adjust or recommend system parameters, e.g. cell bandwidth, or antenna mode, etc, to mitigate interference and/or to accommodate more co-existing cellular user equipments and D2D capable user equipments, etc.

The method according to embodiments herein will now be described seen from the perspective of the first user equipment 302.

Figure 5:
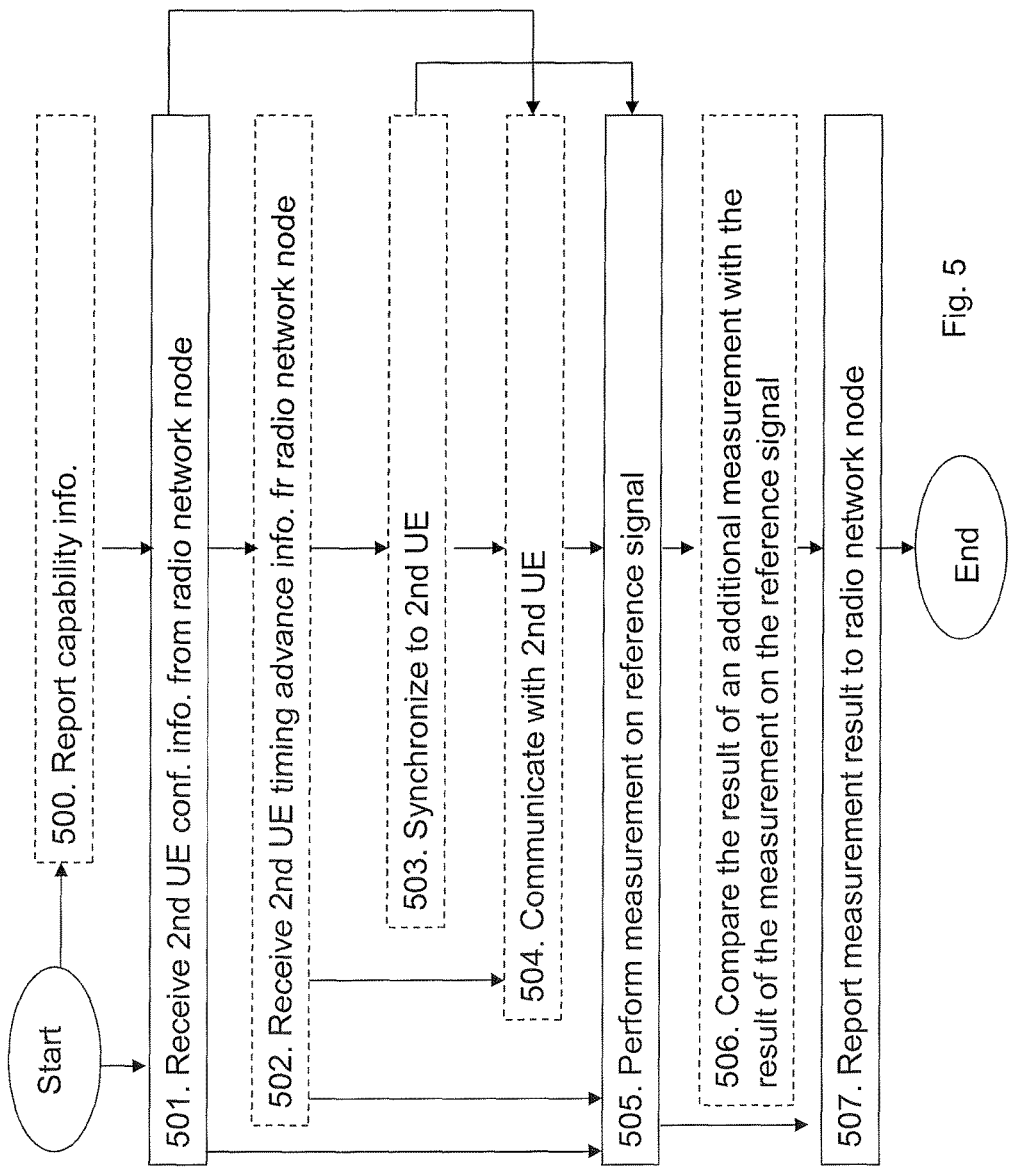
FIG. 5 is a flowchart depicting embodiments of a method in a first user equipment.

A method in the first user equipment 302 for performing a measurement on a reference signal transmitted by the second user equipment 304 in order to assist in resource allocation for D2D communication in a communications network 300 will now be described with reference to FIG. 5.

As previously mentioned, the communications network 300 comprises the first user equipment 302 and the second user equipment 304. At least one of the first and second user equipments 302,304 is the first user equipment capable of D2D communication. Further, the communications network 300 comprises the radio network node 306 configured to serve the first and second user equipments 302,304.

The actions do not have to be performed in the order stated below, but may be taken in any suitable order. Further, actions may be combined.

Action 500

The first user equipment 302 may report that it is capable of performing a measurement on a reference signal transmitted by the second user equipment 304 in order to assist in resource allocation for D2D communication in the communications network 300. The first user equipment 302 may report the capability information to the radio network node 306. However, the first user equipment 302 may report the capability information to other network nodes such as a core network node, e.g. a Mobility Management Entity (MME) in LTE, or to a positioning node, e.g. an Evolved Serving Mobile Location Centre (E-SMLC) in LTE. The signaling of the capability information to any of the above network nodes may be done using any suitable protocols such as RRC, MAC, LTE positioning protocol (LPP) etc.

The reporting of the capability information may be performed since not all first user equipments 302 may be capable of performing such a measurement on the reference signal when D2D communication is used in the communications network 300. For example, all first user equipment 302 may not be capable of performing a measurement on the reference signal transmitted by the second user equipment 304 in order to assist in resource allocation for D2D communication in the communications network 300. More specifically, all D2D capable user equipments may not be capable of performing measurement on the reference signal transmitted by the second user equipment 304, which second user equipment 304 may be a D2D capable user equipment or a cellular user equipment. Similarly, all cellular user equipment may not be capable of performing measurement on the reference signal transmitted by the second user equipment 304, which second user equipment 304 may be a D2D capable user equipment or a cellular user equipment.

The first user equipment 302 may also be capable of performing a specific type of measurement to assist the resource allocation for D2D communication. For example, the first user equipment 302 may indicate that it is only capable of performing path loss measurement on reference signal transmitted by the second user equipment 304. Such a first user equipment 302 performing only one measurement, e.g. a path loss measurement, will require less complex implementation and less processing capability. In another example, the first user equipment 302 may indicate that it is only capable of performing signal strength and signal quality measurements on reference signal transmitted by the second user equipment 304. In yet another example the first user equipment 302 may indicate that it is capable of performing path loss, signal strength and signal quality measurements on reference signal transmitted by the second user equipment 304. In yet another example the first user equipment 302 may indicate that it is capable of performing path loss, signal strength and signal quality measurements on specific type of reference signal, e.g. SRS, transmitted by the second user equipment 304.

In order to avoid unnecessary signalling the communications network 300, e.g. the radio network node 306, will request the first user equipment 302 to perform a certain measurement involving a D2D capable user equipment only if it is capable of performing a measurement on the reference signal transmitted by the second user equipment 304 in order to assist in resource allocation for D2D communication in the communications network 300.

Thus, the first user equipment 302 may report to the radio network node 306 that it is capable of performing a measurement on the reference signal transmitted by the second user equipment 304 in order to assist in resource allocation for D2D communication in the communications network 300. The reported capability information may indicate that the first user equipment 302 is able to perform a measurement on the reference signal transmitted by the second user equipment 304 wherein at least one of the first and second user equipments 302,304 is the first D2D capable user equipment.

For example, a basic capability information may indicate that the first user equipment 302 is capable of performing certain types of measurements, e.g. measurements on signal strength, signal quality, etc., on the reference signal transmitted by the second user equipment 304.

The capability information may also comprise additional capability information or associated parameters (as will be exemplified below). The additional capability information may indicate a limitation in terms of the number of measurements involving D2D that may be performed by the first user equipment 302. The limitation may be expressed in terms of the number of second user equipments 304 over which the measurements may be done in parallel. The limitation may also be expressed in terms of the maximum measurement bandwidth, e.g. 5 MHz, over which the first user equipment 302 may perform measurements on the reference signal transmitted by the second user equipment 304. These limitations may also be pre-defined. Some examples of capability information will now be given.

The capability information may comprise an indication that the first user equipment 302, e.g. a D2D capable user equipment, is capable of performing a measurement on a reference signal transmitted by a cellular user equipment only.

Further, the capability information may comprise an indication that the first user equipment 302, e.g. a D2D capable user equipment, is capable of performing a measurement only on another D2D capable user equipment.

The capability information may further comprise an indication that the first user equipment 302, e.g. a D2D capable user equipment, is capable of performing a measurement on a reference signal transmitted by a cellular user equipment as well as transmitted by another D2D capable user equipment.

Further, the capability information may comprise an indication that the first user equipment 302, e.g. a D2D capable user equipment is capable of performing a measurement on a reference signal transmitted by a cellular user equipment as well as transmitted by another D2D capable user equipment provided the first user equipment 302 does not receive and/or transmit data. This is because the reception and/or transmission of data in parallel with performing measurement on the signal transmitted by the second user equipment 304 involve more complexity in the first user equipment 302.

The capability information may further comprise an indication that the first user equipment 302, e.g. a D2D capable user equipment, is capable of performing a total of N measurements on a reference signal transmitted by a cellular user equipment as well as transmitted by another D2D capable user equipment, wherein the N is an integer between 1 and 6, and wherein the N measurements may be distributed between measurements performed on cellular user equipments and on D2D capable user equipments.

Furthermore, the capability information may comprise an indication that the first user equipment 302, e.g. a cellular user equipment, is capable of performing a measurement on a reference signal transmitted by a D2D capable user equipment.

The capability information may further comprise an indication that the first user equipment 302 is capable of performing a measurement on a reference signal transmitted by a D2D capable user equipment or by a cellular user equipment when the first user equipment 302 is operating in a specific type of Carrier Aggregation (CA) mode e.g. in inter-band CA. This is because such a first user equipment 302 has two independent receiver chains; the first receiver chain may be used for data communication whereas the second receiver chain may be used for measurements.

The first user equipment 302 may report the capability information proactively without receiving any explicit request from e.g. the radio network node 306. In case of proactive reporting, the first user equipment 302 may report its measurement capability during initial setup or call setup e.g. when establishing the RRC connection, or during cell change e.g. handover, change of primary cell in case of CA, change of primary CC in case of CA, RRC re-establishment, and/or RRC connection release with re-direction etc.

Further, the first user equipment 302 may report the capability information upon receiving an explicit request from e.g. the radio network node 306.

Action 501

The first user equipment 302 receives configuration information from the radio network node 306, which configuration information relates to the reference signal transmitted by the second user equipment 304.

As described in relation to action 402, by receiving the configuration information, the first user equipment 302 will get knowledge about the reference signal to be sent from the second user equipment 304 and on which reference signal the first user equipment 302 is to perform a measurement.

Action 502

The first user equipment 302 may receive timing advance information from the radio network node 306.

As described in relation to action 403, by receiving timing advance information the first user equipment 302 may acquire and/or lock on to the one or more reference signal transmitted by the second user equipment 304.

Action 503

The first user equipment 302 may synchronize to the second user equipment 304 by correlating over the reference signal transmitted by the second user equipment 304. This was described in relation to action 405 above and will therefore not be described in more detail here.

As described in relation to action 403, by synchronizing to the second user equipment 304, the first user equipment 302 may acquire and/or lock on to the one or more reference signal transmitted by the second user equipment 304.

This action relates to action 405 described above.

Action 504

In some embodiments, the first user equipment 302 is a user equipment capable of D2D communication and the second user equipment 304 is a cellular user equipment, cf. FIG. 3a. In such embodiments, the first user equipment 302 may communicate with a second D2D capable user equipment 305 on uplink resources of the radio network node 306. The D2D pair communicates on UL cellular resource/frequency & time slot in TDD.

In some embodiments, the first user equipment 302 is a D2D communication capable user equipment and the second user equipment 304 is a second D2D capable user equipment, cf. FIG. 3b. In such embodiments, the first user equipment 302 may communicate with the second D2D capable user equipment 304 on uplink or downlink resources allocated by the radio network node 306.

Action 505

The first user equipment 302 performs a measurement on the reference signal transmitted by the second user equipment 304, which measurement is based on the received configuration information.

The first user equipment 302 may perform the measurement based on the received timing advance information, cf. action 502.

In some embodiments, the first user equipment 302 is a user equipment capable of D2D communication and the second user equipment 304 is a cellular user equipment, cf. FIG. 3a. In such embodiments, the D2D capable user equipment may perform the measurement on an uplink reference signal transmitted by the cellular user equipment.

In some embodiments, the first user equipment 302 is a first D2D capable user equipment and the second user equipment 304 is a second D2D capable user equipment, cf. FIG. 3b. In such embodiments, the first D2D capable user equipment 302 may perform the measurement on an uplink reference signal transmitted by the second D2D capable user equipment 304.

In some embodiments, the first user equipment 302 is a cellular user equipment and the second user equipment 304 is a D2D capable user equipment communicating on downlink resources, cf. FIG. 3c. In such embodiments, the action that the first user equipment 302 performs the measurement further comprises performing an additional measurement on a reference signal transmitted by the radio network node 306. By performing the two measurements, the first user equipment 302, i.e. the cellular user equipment, may report measurement results related to the path loss between the D2D capable user equipment 302 and the second user equipment 304, i.e. the cellular user equipment, as well as to the path loss between the radio network node 306 and the cellular user equipment. These two pieces of information allow the radio network node 306 to control power and PRB allocation to the first and second user equipments 302,304. In other words, the two measurements allow the radio network node 306 to have knowledge about the geometry of the first and second user equipments 302,304.

The additional measurement on the reference signal transmitted by the radio network node 306 may be of the same type as the measurement on the reference signal transmitted by the second user equipment 304.

In some embodiments, the first user equipment 302 performs the measurement on the reference signal based on an assumption that the transmit timing of the first user equipment 302 is equal to the transmit timing of the second user equipment 304.

Further, the first user equipment 302 may perform measurements on multiple frequency channels of the transmission from the second user equipment 304 for implementing frequency selective scheduling.

Furthermore, the first user equipment 302 may perform channel quality estimation on the reference signal.

In some embodiments, the first user equipment 302 performs measurements on PRBs to determine the PRBs not used to transmit data.

The first user equipment 302 may further perform measurements on signal strength, signal quality, and/or path loss.

This action relates to action 406 described above.

Action 506

In some embodiments, the first user equipment 302 is a cellular user equipment and the second user equipment 304 is the first D2D capable user equipment communicating on downlink resources, cf. FIG. 3c. In such embodiments, the first user equipment 302 compares the result of the additional measurement on a reference signal transmitted by the radio network node 306 with the result of the measurement on the reference signal transmitted by the second user equipment 304.

The comparison may allow the first user equipment 302 and the radio network node 306 to know how strong interference the second user equipment 304 would cause to the first user equipment 302 if they are scheduled on the same PRB. Therefore, the additional measurement and the reporting may allow the radio network node 306 to exercise efficient radio network operation or radio resource management tasks, e.g. scheduling and power control, of the first and second user equipments 302,304, respectively.

Action 507

The first user equipment 302 reports a result of the performed measurement to the radio network node 306.

The first user equipment 302 may report the result from one or more second user equipments 304 for which second user equipments' 304 transmission causes interference at the first user equipment 302.

In some embodiments, the first user equipment 302 may report the result from one or more second user equipments 304 when the received signal level, e.g. signal strength, signal quality, or path loss, etc, from them is above a threshold level. The threshold level may be configurable by the radio network node 306 or it may be a pre-defined threshold level.

The first user equipment 302 may be triggered to perform result reporting by completion of the measurement on the reference signal. Further, the first user equipment 302 may report the result periodically, e.g. at predetermined or pre-configured points in time. Furthermore, the first user equipment 302 may report the results in an event-triggered manner, e.g. to report when the result of the measurement exceeds a preconfigured threshold or a pre-defined threshold. The first user equipment 302 may further report the results in an event-triggered periodic manner, e.g. to report a first result when the result of the measurement exceeds a preconfigured threshold or a pre-defined threshold and thereafter continue to report the results periodically.

In some embodiments, the first user equipment 302 is a cellular user equipment and the second user equipment 304 is the first D2D capable user equipment communicating on downlink resources, cf. FIG. 3c. In such embodiments, the first user equipment 302 further reports the result of the comparison to the radio network node 306. The result of the comparison may be valuable information for the radio network node 306 when the scheduling the DL resources for the first user equipment 302 being a cellular user equipment and for a D2D pair, since here the D2D pair communicates on DL resources for the D2D link. The radio network node 306 may thus be informed about the geometry or signal quality of the respective first and second user equipments 302,304 with respect to each other over the given set of radio resources. This enables the radio network node 306 to determine whether or not the first and second user equipments 302,304, respectively, may use the same radio resources, e.g. PRB. For example, if first and second user equipments 302,304 bear similar geometry or possess similar signal quality, then the radio network node 306 may avoid assigning the same radio resources to the first and second user equipments 302,304.

This action relates to action 407 described above.

Figure 6:
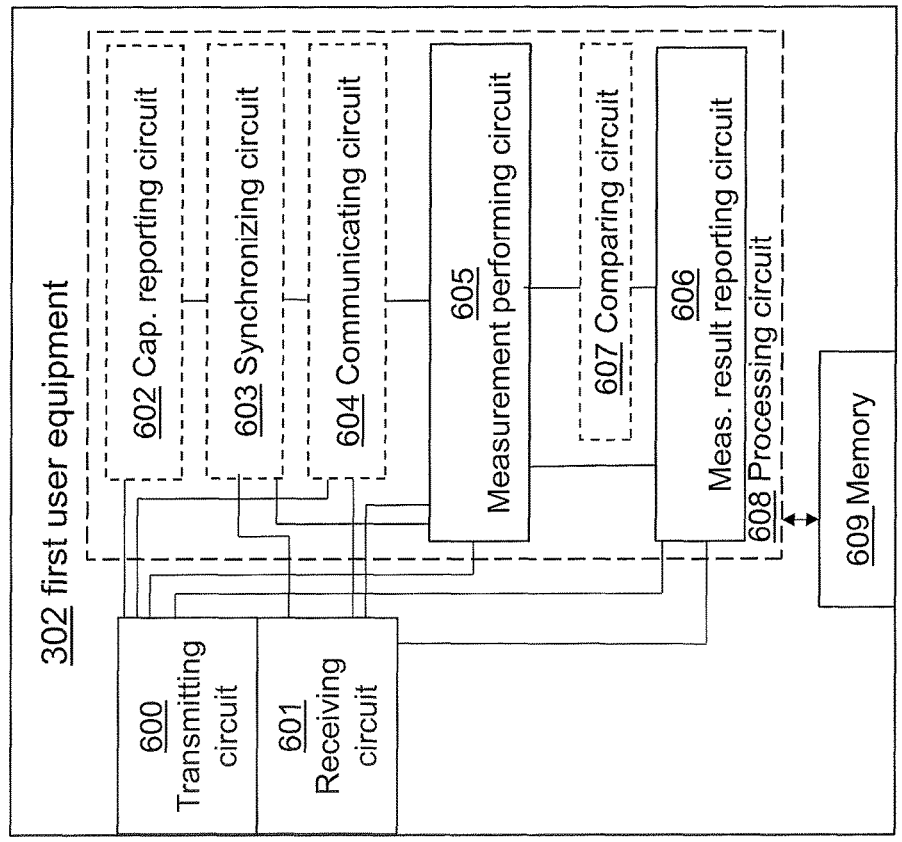
FIG. 6 is a flowchart depicting embodiments of a first user equipment.
Figure 6:
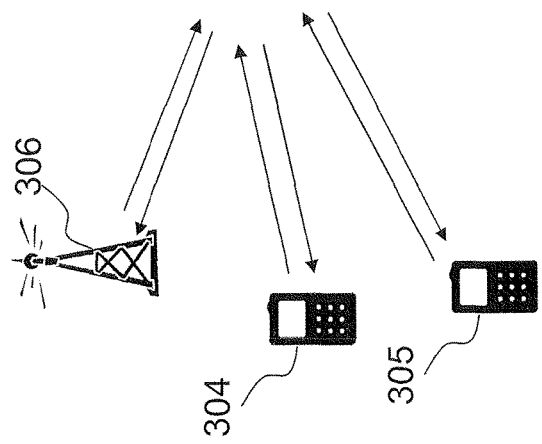

To perform the method actions in the first user equipment 302 described above for performing a measurement on a reference signal transmitted by the second user equipment 304, the first user equipment 302 comprises the following arrangement depicted in FIG. 6. As previously mentioned, the reference signal may be a PSS, a SSS, a SRS, a DMRS, an arbitrary pilot signal, or a pre-defined signal.

Further, the communications network 300 comprises the first user equipment 302, the second user equipment 304. At least one of the first and second user equipments 302,304 is the first user equipment capable of D2D communication. Further, the communications network 300 comprises the radio network node 306 configured to serve the first and second user equipments 302,304.

The first user equipment 302 comprises a transmitting circuit 600 which may be configured to transmit signals and information from the first user equipment 302 to one or more second user equipment 304 and/or to one or more radio network node 306.

The first user equipment 302 comprises a receiving circuit 601 which may be configured to receive configuration information from the radio network node 306. The configuration information relates to the reference signal transmitted by the second user equipment 304.

In some embodiments, the receiving circuit 601 is configured to receive timing advance information from the radio network node 306.

Further, the first user equipment 302 may comprise a capability reporting circuit 602 configured to report capability information. The capability reporting circuit 602 may be configured to report the capability information to the radio network node 306.

In some embodiments wherein the first user equipment 302 is the first D2D capable user equipment, cf. FIGS. 3a and 3b, the capability information indicates that the first user equipment 302 is capable of performing at least one measurement on the reference signal transmitted by the second user equipment 304.

When the first user equipment 302 is a cellular user equipment and the second user equipment 304 is the first D2D capable user equipment, cf. FIG. 3c, the capability information indicates that the first user equipment 302 is capable of performing at least one measurement on the reference signal transmitted by second user equipment 304.

In some embodiments, the capability reporting circuit 602 is configured to report the capability information to other network nodes such as a core network node, e.g. a Mobility Management Entity (MME) in LTE, or to a positioning node, e.g. an Evolved Serving Mobile Location Centre (E-SMLC) in LTE. The signaling of the capability information to any of the above network nodes may be done using any suitable protocols such as RRC, MAC, LTE positioning protocol (LPP) etc.

The first user equipment 302 may further comprise a synchronizing circuit 603 configured to synchronize to the second user equipment 304 by correlating over the reference signal transmitted by the second user equipment 304.

The synchronization circuit 603 may be configured to provide a user equipment-to-user equipment synchronization, e.g. a first user equipment 302 to a second user equipment 304 synchronization, as described in relation to action 405 above. The user equipment-to-user equipment synchronization means both a time, e.g. a symbol, synchronization and a frequency synchronization. Time synchronization means that the synchronization circuit 603 of each of the two user equipments are able to determine the exact time instant at which a transmitted symbol, e.g. an OFDM symbol, starts. In other words, the two user equipments may rely on the notion of a common clock and 0 point in time. Frequency synchronization means that the two user equipments use the same carrier frequency and subcarrier frequencies. That is any carrier frequency offset between the two user equipments is eliminated. The combined time and frequency synchronization means that the two user equipments use the same time-frequency notion, and thereby, that the two user equipments use the same notion of PRBs.

As previously mentioned, in, for example, the 3GPP LTE system, a DL synchronization between an eNB and a user equipment is obtained by using predefined (primary and secondary) synchronization channels (P-SCH and S-SCH) that use one or more predefined complex sequences, e.g. a Zadoff-Chu sequence, which one or more predefined complex sequences the user equipment may capture and synchronize to in order to synchronize its clock and eliminate its frequency offset.

The first user equipment 302 may further comprise a communicating circuit 604.

In some embodiments, the first user equipment 302 is the first D2D capable user equipment and the second user equipment 304 is a cellular user equipment, cf. FIG. 3a. In such embodiments, the communicating circuit 604 is configured to communicate with a second D2D capable user equipment 305 on uplink resources of the radio network node 306. The D2D pair communicates on UL cellular resource, frequency and time slot in TDD.

In some embodiments, the first user equipment 302 is the first D2D capable user equipment, and the second user equipment 304 is a second D2D capable user equipment, cf. FIG. 3b. In such embodiments, the communicating circuit 604 is configured to communicate with the second user equipment 304 on uplink or downlink resources allocated by the radio network node 306.

The first user equipment 302 comprises further a performing circuit 605 configured to perform a measurement on the reference signal transmitted by the second user equipment 304. The first user equipment 302 performs the measurement based on the received configuration information.

In some embodiments, the performing circuit 605 is configured to perform the measurement based on the received timing advance information.

Further, the performing circuit 605 may configured to perform the measurement on the reference signal based on an assumption that the transmit timing of the first user equipment 302 is equal to the transmit timing of the second user equipment 304.

In some embodiments, the performing circuit 605 is further configured to perform measurements on multiple frequency channels on the second user equipment 304 transmission for implementing frequency selective scheduling, channel quality estimation on the reference signal, PRBs to determine the PRBs not used to transmit data, signal strength, e signal quality, and/or path loss.

In some embodiments, the first user equipment 302 is the first D2D capable user equipment and the second user equipment 304 is a cellular user equipment, cf. FIG. 3a. In such embodiments, the performing circuit 605 further is configured to perform the measurement on an uplink reference signal transmitted by the second user equipment 304.

In some embodiments, the first user equipment 302 is the first D2D capable user equipment, and the second user equipment 304 is a second D2D capable user equipment, cf. FIG. 3b. In such embodiments, the performing circuit 605 is configured to perform the measurement on an uplink reference signal transmitted by the second user equipment 305.

In some embodiments, the first user equipment 302 is a cellular user equipment and the second user equipment 304 is the first D2D capable user equipment communicating on downlink resources, cf. FIG. 3c. In such embodiments, the performing circuit 605 is configured to perform an additional measurement on a reference signal sent from the radio network node 306. As previously described, the additional measurement on the reference signal transmitted by the radio network node 306 may be of the same type as the measurement on the reference signal transmitted by the second user equipment 304.

Further, the first user equipment 302 comprises a reporting circuit 606 configured to report a result of the performed measurement to the radio network node 306.

The reporting circuit 606 may be configured to report the result from one or more second user equipment 304, the transmission from which second user equipment 304 causes interference at the first user equipment 302.

Further, the reporting circuit 606 may be configured to report the result from one or more second user equipments 304 whose received signal level, e.g. signal strength, signal quality, or path etc, is above a threshold level, wherein the threshold level is configurable by the radio network node 306 or pre-defined.

In some embodiments, the reporting circuit 606 is configured to be triggered to report by completion of the measurement on the reference signal transmitted by the second user equipment 304. However, the reporting circuit 606 may be configured to report periodically, or the reporting circuit 606 may be event-triggered to report the measurement result exceeding a preconfigured threshold.

Further, in some embodiments, the first user equipment 302 is a cellular user equipment and the second user equipment 304 is the first D2D capable user equipment communicating on downlink resources, cf. FIG. 3c. In such embodiments, the reporting circuit 606 further is configured to report the result of the comparison to the radio network node 306. The result of the comparison may be valuable information to the radio network node 306 when scheduling the DL resources for the first user equipment 302, i.e. the cellular user equipment, and the D2D pair, since here the D2D pair communicates on DL resources for the D2D link.

The first user equipment 302 may further comprise a comparing circuit 607 configured to compare measurement results.

In some embodiments, the first user equipment 302 is a cellular user equipment and the second user equipment 304 is the first D2D capable user equipment communicating on downlink resources, cf. FIG. 3c. In such embodiments, the comparing circuit 607 is configured to compare the result of the additional measurement on the reference signal transmitted by the radio network node 306 with the result of the measurement on the reference signal transmitted by the second user equipment 304.

The result of the comparison may be that the first user equipment 302 and the radio network node 306 know the path loss difference between the first user equipment—second user equipment link and the radio network node first user equipment link, i.e. the path loss difference between the link between the first user equipment and second user equipment and the link between the radio network node and the first user equipment. In other words, the radio network node 306 knows which link is the stronger link. This allows the radio network node 306 to determine the interference caused to the first user equipment 302 by the transmission of the second user equipment 304. Thereby, the radio network node 306 may determine whether or not the first user equipment 302 should use the same radio resources, e.g. PRB, as the radio network node 306 for DL transmission.

Embodiments herein for performing a measurement on a reference signal transmitted by the second user equipment 304 in order to assist in resource allocation for D2D communication in a communications network 300 may be implemented through one or more processors, such as a processing circuit 608 in the first user equipment depicted in FIG. 6, together with computer program code for performing the functions and/or method actions of embodiments herein.

It should be understood that one or more of the circuits comprised in the first user equipment 302 described above may be integrated with each other to form an integrated circuit. For example, the communication circuit 604 may be integrated with one or both of the transmitting circuit 600 and the receiving circuit 601.

The first user equipment 302 may further comprise a memory 609. The memory may comprise one or more memory units and may be used to store for example data such as thresholds, predefined or preset information, etc.

The method according to embodiments herein will now be described seen from the perspective of the radio network node 306.

Figure 7:
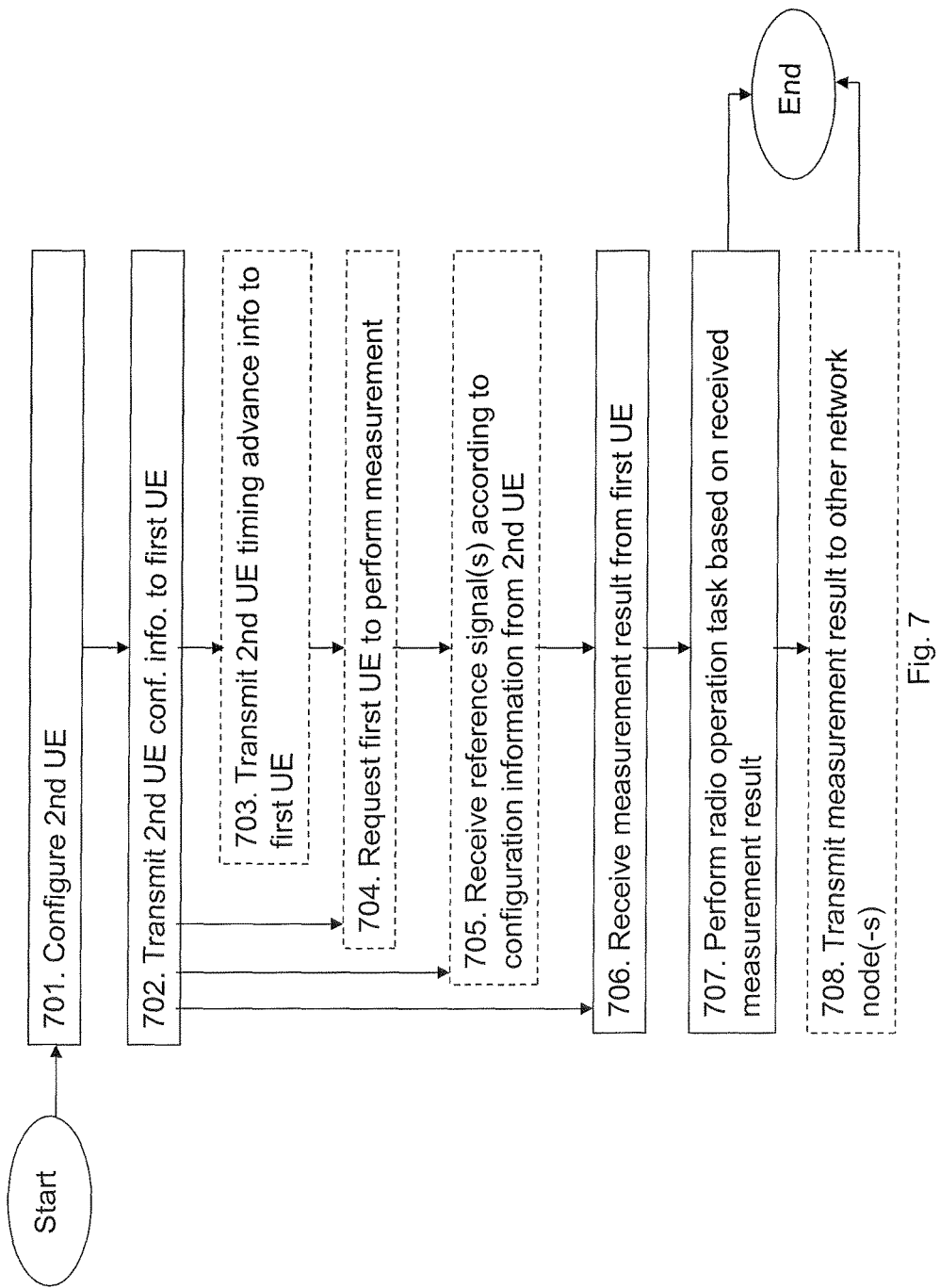
FIG. 7 is a flowchart depicting embodiments of a method in a network node.

A method in the radio network node 306 for performing a measurement on a reference signal transmitted by the second user equipment 304 in order to assist in resource allocation for D2D communication in a communications network 300 will now be described with reference to FIG. 7. Further, as previously mentioned, the reference signal may be a PSS, a SSS, a SRS, a DMRS, an arbitrary pilot signal, or a pre-defined signal. The actions do not have to be performed in the order stated below, but may be taken in any suitable order. Further, actions may be combined.

Action 701
The radio network node 306 configures the second user equipment 304 to transmit a reference signal.

In some embodiments, radio network node 306 configures the second user equipment 304 by transmitting configuration information to the second user equipment 304 using a broadcast parameter or specific signalling for the second user equipment 304.

Further, the radio network node 306 may configure the second user equipment 304 to transmit the reference signal over a part of the bandwidth or over the entire bandwidth.

Furthermore, the radio network node 306 may configure the reference signal bandwidth, the reference signal duration and/or periodicity, the reference location within a subframe, the cyclic shift for the Zadoff-Chu sequence, and/or the hopping sequence information of the second user equipment 304.

In some embodiments, the radio network node 306 configures transmit timing advance of the second user equipment 304.

This action relates to action 401 and will therefore not be described in more detail here.

Action 702
The radio network node 306 transmits configuration information relating to the second user equipment 304 to the first user equipment 302.

This action relates to action 402 and will therefore not be described in more detail here.

Action 703
The radio network node 306 may transmit timing advance information relating to the second user equipment 304 to the first user equipment 302.

This action relates to action 403 and will therefore not be described in more detail here.

Action 704
The radio network node 306 may request the first user equipment 302 to perform a specific measurement on received power, received interference, and/or bit error rate of the reference signal transmitted by the second user equipment 304.

As described in relation to action 500 above, the first user equipment 302 may report capability information to the radio network node 306. Therefore, the action of requesting the first user equipment 302 to perform a specific measurement may further comprise the action of receiving capability information from the first user equipment 302. The radio network node 306 may use the received capability information for measurement configuration. For example, the radio network node 306 may in dependence of the capability information configure the first user equipment 302 to perform one or more measurements to assist in resource allocation for D2D communication in the communications network 300. Therefore, the radio network node 306 may request the first user equipment 302 to perform one or more measurements according to its supported measurement capability reported in the capability information. If the first user equipment 302 supports more than one type of measurements, then the radio network node 306 may request the first user equipment 302 to perform one specific measurement out of the supported measurements.

This action relates to action 404 and will therefore not be described in more detail here.

Action 705
The radio network node 306 may receive one or more reference signal according to the configuration information from the second user equipment 304.

In some embodiments, the radio network node 306 transmits the received reference signal to the first user equipment 302, which first user equipment 302 may perform the additional measurement as described in action 505 above.

Action 706

The radio network node 306 receives a result of a measurement on the reference signal transmitted by the second user equipment 304, the measurement being performed by the first user equipment 302 on the transmitted reference signal.

In some embodiments, the first user equipment 302 is a cellular user equipment and the second user equipment 304 is the first D2D capable user equipment communicating on downlink resources, cf. FIG. 3c. In such embodiments, the radio network node 306 further receives the result of the comparison of measurements performed by the first user equipment 302 on the reference signal sent from the second user equipment 304 and from a reference signal sent from the radio network node 306. The result of the comparison may be valuable information for the radio network node 306 when the scheduling the DL resources for the first user equipment 302 being a cellular user equipment and for a D2D pair, since here the D2D pair communicates on DL.

The radio network node 306 may transmit the reference signal, e.g. the cell specific reference signal (CRS), primary synchronization signals (PSS), secondary synchronization signals (SSS) etc, at pre-determined time points. In LTE, for example, the CRS is sent in every sub-frame over the entire cell transmission bandwidth. Similarly, in LTE, the PSS/SSS may be sent in subframe #0 and subframe #5 over the central six resource blocks in the frequency domain.

Action 707

The radio network node 306 performs one or more radio operation task for a D2D communication between the first D2D capable user equipment and a second D2D capable user equipment based on or using the result of the measurement.

In some embodiments, the radio network node 306 perform the one or more radio operation task by scheduling frequency and time domain for D2D communication and cellular communication, selecting antenna mode for uplink transmission, adapting transport format for the second user equipment 304, controlling transmission power of the second user equipment 304, performing a cell change for the second user equipment 304, and/or by managing radio resources within the communications network 300.

In some embodiments, the first user equipment 302 is a cellular user equipment and the second user equipment 304 is the first D2D capable user equipment communicating on downlink resources, cf FIG. 3c. In such embodiments, the radio network node 306 may use the result of the comparison when scheduling the DL resources for the first user equipment 302 being a cellular user equipment and for a D2D pair, e.g. the first D2D capable user equipment and a second D2D capable user equipment 305, since here the D2D pair communicates on DL resources for the D2D link.

This action relates to action 507 and will therefore not be described in more detail here.

Action 708

The radio network node 306 may transmit the result of the measurement to one or more other radio network nodes 306 or to one or more network node 310 comprised in the communications network 300, which one or more other radio network node 306 or one or more network node 310 may use the measurement result for one or more network operation task.

The network node 310 may be an OSS node, a SON node, a MDT node, an O&M node, a networking monitoring node, network management node, a network planning node, a core network node, a positioning node, a centralized node, or a network controlling node.

Further, the network node 310 may be configured to perform one or more network operation task such as network planning, network monitoring, network management or tuning of network operational parameters.

Figure 8:
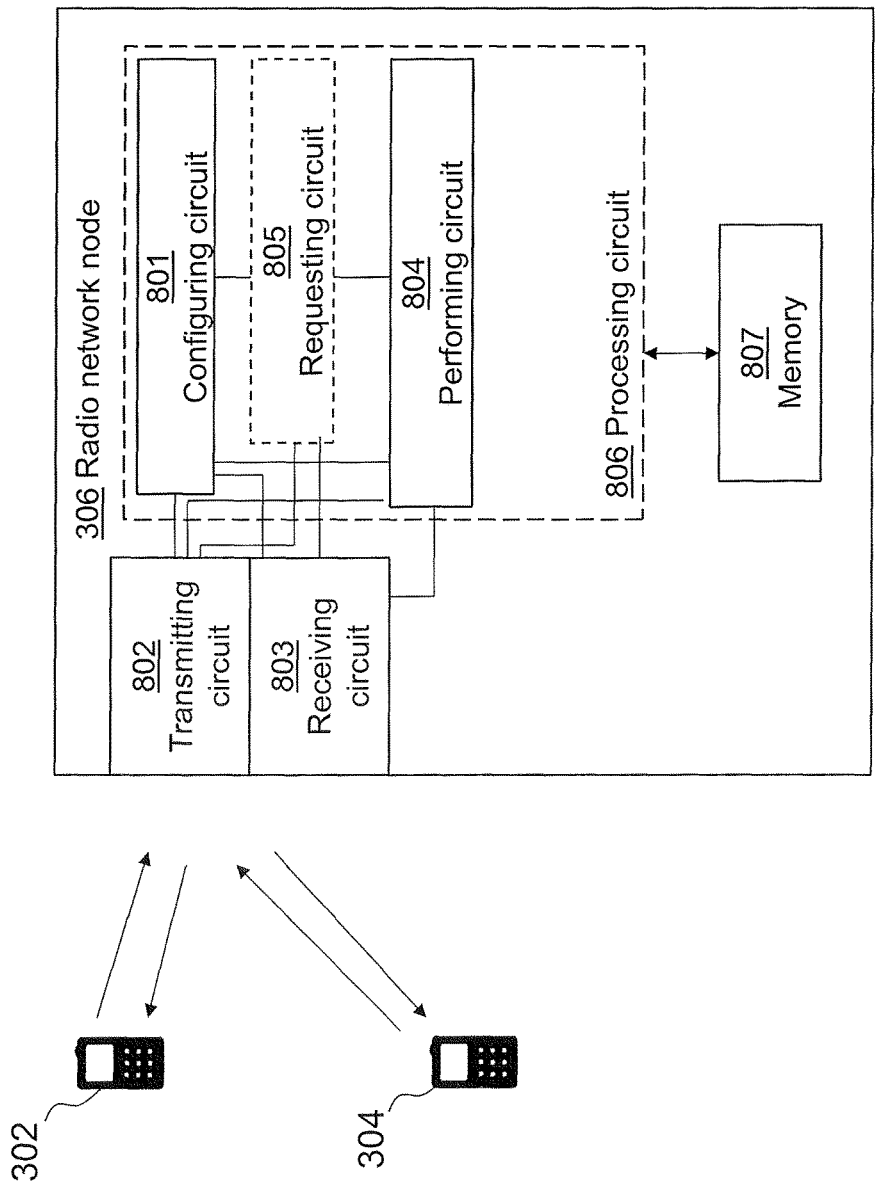
FIG. 8 is a schematic block diagram illustrating embodiments of a network node.

To perform the method actions in the radio network node 306 described above for performing controlling resource allocation for D2D communication in a communications network 300, the radio network node 306 comprises the following arrangement depicted in FIG. 8. The communications network 300 comprises the first user equipment 302, the second user equipment 304, and at least one of the first and second user equipments 302,304 is the first D2D capable user equipment. Further, the communications network 300 comprises a radio network node 306 configured to serve the first and second user equipments 302,304.

The radio network node 306 comprises a configuring circuit 801 configured to configure the second user equipment 304 to transmit a reference signal.

As previously mentioned, the reference signal may be a PSS, a SSS, a SRS, a DMRS, an arbitrary pilot signal, or a pre-defined signal.

The configuring circuit 801 may further be configured to configure the second user equipment 304 to transmit the reference signal over a part of the bandwidth or over the entire bandwidth.

In some embodiments, the configuring circuit 801 is configured to configure the reference signal bandwidth, the reference signal duration and/or periodicity, the reference location within a subframe, the cyclic shift for the Zadoff-Chu sequence, and/or the hopping sequence information of the second user equipment 304.

Further, the configuring circuit 801 may be configured to configure the transmit timing advance of the second user equipment 304.

The radio network node 306 comprises further a transmitting circuit 802 configured to transmit configuration information relating to the second user equipment 304 to the first user equipment 302.

The transmitting circuit 802 may further be configured to transmit configuration information to the second user equipment 304 by using a broadcast parameter or specific signalling for the second user equipment 304.

In some embodiments, the transmitting circuit 802 is configured to transmit timing advance information relating to the second user equipment 304 to the first user equipment 302.

The transmitting circuit 802 may further be configured to transmit the result of the measurement to one or more other radio network nodes 306 or to one or more network node 310 comprised in the communications network 300, which one or more other radio network node 306 or one or more network node 310 may use the measurement result for one or more network operation task.

The network node 310 may be an OSS node, a SON node, a MDT, an O&M node, a networking monitoring node, network management node, a network planning node, a core network node, a positioning node, a centralized node, or a network controlling node. Further, the network node 310 may be configured to perform one or more network operation task such as network planning, network monitoring, network management or tuning of network operational parameters.

In some embodiments, the radio network node 306 transmits one or more reference signal received from the second user equipment 304 to the first user equipment 302, which first user equipment 302 may be configured to perform the additional measurement as described in action 505 above.

Further, the radio network node 306 comprises a receiving circuit 803 configured to receive a result of a measurement on the reference signal transmitted by the second user equipment 304. The measurement is performed by the first user equipment 302 on the transmitted reference signal.

The radio network node 306 comprises a performing circuit 804 configured perform one or more radio operation task for a D2D communication between a first D2D capable user equipment and a second D2D capable user equipment based on or using the result of the measurement.

The performing circuit 804 may be configured to schedule frequency and time domain for D2D communication and cellular communication, select antenna mode for uplink transmission, adapt transport format for the second user equipment 304, control transmission power of the second user equipment 304, perform a cell change for the second user equipment 304 and/or to manage radio resources within the communications network 300.

Further, the radio network node 306 may comprise a requesting circuit 805 configured to request the first user equipment 302 to perform a specific measurement on received power, received interference, and/or bit error rate of the reference signal transmitted by the second user equipment 304.

As described in relation to actions 500 and 704 above, the first user equipment 302 may report capability information to the radio network node 306. Therefore, the requesting circuit 805 may be configured to request the first user equipment 302 to perform a specific measurement based on the received capability information from the first user equipment 302. For example, the requesting circuit 805 may in dependence of the capability information configure the first user equipment 302 to perform one or more measurements to assist in resource allocation for D2D communication in the communications network 300. Therefore, the requesting circuit 805 may request the first user equipment 302 to perform one or more measurements according to its supported measurement capability reported in the capability information. If the first user equipment 302 supports more than one type of measurements, then the requesting circuit 805 may request the first user equipment 302 to perform one specific measurement out of the supported measurements.

Embodiments herein for performing controlling resource allocation for D2D communication in a communications network 300 may be implemented through one or more processors, such as a processing circuit 806, in the radio network node depicted in FIG. 6, together with computer program code for performing the functions and/or method actions of embodiments herein.

The radio network node 306 may further comprise a memory 807. The memory may comprise one or more memory units and may be used to store for example data such as configuration information, thresholds, predefined or preset information, or measurement results, etc.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

Further, the dotted boxes and dotted arrows in the drawings schematically illustrate optional features and actions of embodiments herein.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a first user equipment for performing a measurement on a reference signal transmitted by a second user equipment, wherein the first user equipment is a device-to-device (D2D) communication capable user equipment and the second user equipment is a cellular user equipment without D2D communication capability, wherein the first user equipment, the second user equipment, and a radio network node are comprised in a communications network, the method comprising:
   receiving configuration information from the radio network node, the configuration information relating to the reference signal transmitted by the second user equipment;
   performing, by the first user equipment that is a D2D communication capable user equipment, a measurement on the reference signal transmitted by the second user equipment that is without D2D communication capability, wherein the measurement is performed based on the received configuration information; and
   reporting a result of the performed measurement to the radio network node in order to assist in resource allocation for D2D communication in the communications network.

2. The method of claim 1, further comprising:
   receiving timing advance information from the radio network node; and
   wherein performing the measurement on the reference signal further comprises performing the measurement based on the received timing advance information.

3. The method of claim 1, wherein performing the measurement on the reference signal further comprises performing the measurement based on an assumption that transmit timing of the first user equipment is equal to transmit timing of the second user equipment.

4. The method of claim 1, further comprising:
   synchronizing to the second user equipment by correlating over the reference signal transmitted by the second user equipment.

5. The method of claim 1, wherein performing the measurement further comprises one or more of:
   performing measurements on multiple frequency channels on the second user equipment transmission for implementing frequency selective scheduling;

performing channel quality estimation on the reference signal;
performing measurements on Physical Resource Blocks (PRBs) to determine PRBs not used to transmit data; and
performing signal strength measurement, signal quality measurement, and/or path loss measurement.

6. The method of claim 1, wherein reporting the result further comprises reporting a result from one or more other user equipment causing interference to the first user equipment.

7. The method of claim 1, wherein reporting the result further comprises reporting a result from one or more other user equipment whose received signal level is above a threshold level, and wherein the threshold level is configurable by the radio network node or pre-defined.

8. The method of claim 1, wherein reporting the result is triggered by completion of the measurement on the reference signal, is periodic, or is event-triggered by a result of the measurement exceeding a preconfigured threshold.

9. The method of claim 1, wherein the method further comprises:
reporting capability information of the first user equipment to the radio network node, and wherein the capability information indicates that the first user equipment is capable of performing at least one measurement on the reference signal transmitted by the second user equipment.

10. The method of claim 1, wherein the method further comprises:
communicating with a second D2D capable user equipment on uplink resources of the radio network node; and
wherein performing the measurement further comprises performing a measurement on an uplink reference signal transmitted by the second user equipment.

11. The method of claim 1, wherein the first user equipment is a first D2D capable user equipment, and a third user equipment is a second D2D capable user equipment, wherein the method further comprises:
communicating with the third user equipment on uplink or downlink resources allocated by the radio network node; and
wherein performing the measurement further comprises performing a measurement on an uplink reference signal transmitted by the second user equipment.

12. The method of claim 1, wherein a third user equipment is a cellular user equipment, wherein the method further comprises:
the third user equipment reporting capability information of the third user equipment to the radio network node, and wherein the capability information indicates that the third user equipment is capable of performing at least one measurement on the reference signal transmitted by the second user equipment.

13. The method of claim 1, wherein a third user equipment is a cellular user equipment and a fourth user equipment is a second D2D capable user equipment communicating on downlink resources, and
wherein performing the measurement further comprises performing an additional measurement on a reference signal transmitted by the radio network node;
comparing a result of the additional measurement on the reference signal transmitted by the radio network node with a result of the measurement on the reference signal transmitted by the second user equipment; and
wherein reporting the result further comprises reporting a result of the comparison to the radio network node.

14. The method of claim 1, wherein the reference signal is one of: a Primary Synchronization Signal (PSS), a Secondary Synchronization Signal (SSS), a Sounding Reference Signal (SRS), a DeModulation Reference Signal (DMRS), an arbitrary pilot signal, or a pre-defined signal.

15. A first user equipment for performing a measurement on a reference signal transmitted by a second user equipment, wherein the first user equipment is a device-to-device (D2D) communication capable user equipment and the second user equipment is a cellular user equipment without D2D communication capability, and wherein the first user equipment, the second user equipment, and a radio network node are comprised in a communications system, the first user equipment comprising:
a receiving circuit to receive configuration information from the radio network node, the configuration information relating to the reference signal transmitted by the second user equipment;
a performing circuit to perform a measurement on the reference signal transmitted by the second user equipment that is without D2D communication capability, wherein the measurement is performed based on the received configuration information; and
a reporting circuit to report a result of the performed measurement to the radio network node in order to assist in resource allocation for D2D communication in a communications network.

16. The first user equipment of claim 15, wherein:
the receiving circuit further receives timing advance information from the radio network node; and
the performing circuit further performs the measurement based on the received timing advance information.

17. The first user equipment of claim 15, wherein the performing circuit further performs the measurement on the reference signal based on an assumption that transmit timing of the first user equipment is equal to transmit timing of the second user equipment.

18. The first user equipment of claim 15, further comprising:
a synchronizing circuit to synchronize to the second user equipment by correlating over the reference signal transmitted by the second user equipment.

19. The first user equipment of claim 15, wherein the performing circuit performs measurements on one or more of:
multiple frequency channels on the second user equipment transmission for implementing frequency selective scheduling;
channel quality estimation on the reference signal;
Physical Resource Blocks (PRBs) to determine PRBs not used to transmit data;
signal strength;
signal quality; and
path loss.

20. The first user equipment of claim 15, wherein the reporting circuit further reports a result from one or more other user equipment causing interference to the first user equipment.

21. The first user equipment of claim 15, wherein the reporting circuit further reports a result from one or more other user equipment whose received signal level is above a threshold level, and wherein the threshold level is configurable by the radio network node or pre-defined.

22. The first user equipment of claim 15, wherein the reporting circuit is triggered to report by completion of the measurement on the reference signal transmitted by the second user equipment, periodically, or by a measurement result exceeding a preconfigured threshold.

23. The first user equipment of claim 15, wherein the first user equipment comprises a capability reporting circuit to report capability information to the radio network node, wherein the capability information indicates that the first user equipment is capable of performing at least one measurement on the reference signal transmitted by the second user equipment.

24. The first user equipment of claim 15, wherein the first user equipment further comprises:
   a communicating circuit to communicate with a second D2D capable user equipment on uplink resources of the radio network node; and
   wherein the performing circuit further performs a measurement on an uplink reference signal transmitted by the second user equipment.

25. The first user equipment of claim 15, wherein the first user equipment is a first D2D capable user equipment, and wherein a third user equipment is a second D2D capable user equipment, the first user equipment further comprising:
   a communicating circuit to communicate with the second user equipment on uplink or downlink resources allocated by the radio network node; and
   wherein the performing circuit further performs a measurement on an uplink reference signal transmitted by the second user equipment.

26. The first user equipment of claim 15, wherein a third user equipment is a cellular user equipment comprising a capability reporting circuit to report a capability information to the radio network node, wherein the capability information indicates that the third user equipment is capable of performing at least one measurement on the reference signal transmitted by the second user equipment.

27. The first user equipment of claim 15, wherein a third user equipment is a cellular user equipment and a fourth user equipment is a second D2D capable user equipment communicating on downlink resources, and
   wherein the performing circuit further performs an additional measurement on a reference signal sent from the radio network node, the first user equipment further comprising:
   a comparing circuit to compare a result of the additional measurement on the reference signal transmitted by the radio network node with a result of the measurement on the reference signal transmitted by the second user equipment; and
   wherein the reporting circuit further reports a result of the comparison to the radio network node.

28. The first user equipment of claim 15, wherein the reference signal is one of: a Primary Synchronization Signal (PSS), a Secondary Synchronization Signal (SSS), a Sounding Reference Signal (SRS), a DeModulation Reference Signal (DMRS), an arbitrary pilot signal, or a pre-defined signal.

* * * * *